(12) United States Patent
Chen et al.

(10) Patent No.: US 7,103,218 B2
(45) Date of Patent: Sep. 5, 2006

(54) IMAGE PROCESSING METHODS AND APPARATUS FOR DETECTING HUMAN EYES, HUMAN FACE, AND OTHER OBJECTS IN AN IMAGE

(75) Inventors: Xinwu Chen, Beijing (CN); Xin Ji, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/235,132

(22) Filed: Sep. 27, 2005

(65) Prior Publication Data
US 2006/0018517 A1 Jan. 26, 2006

Related U.S. Application Data

(62) Division of application No. 09/951,458, filed on Sep. 14, 2001, now Pat. No. 6,965,684.

(30) Foreign Application Priority Data
Sep. 15, 2000 (CN) ................. 00 1 27067
Sep. 6, 2001 (CN) ................. 01 1 32807

(51) Int. Cl.
*G06K 9/62* (2006.01)
(52) U.S. Cl. ............... 382/170; 382/218
(58) Field of Classification Search ........ 382/170, 382/197, 205, 209, 217, 218, 220
See application file for complete search history.

(56) References Cited

U.S. PATENT DOCUMENTS

| | | | |
|---|---|---|---|
| 4,958,374 A * | 9/1990 | Tokita et al. | 382/149 |
| 5,293,427 A | 3/1994 | Ueno et al. | 382/1 |
| 5,499,303 A | 3/1996 | Hundt et al. | 382/100 |
| 5,859,921 A | 1/1999 | Suzuki | 382/118 |
| 6,072,892 A | 6/2000 | Kim | 382/117 |
| 6,115,495 A * | 9/2000 | Tachikawa et al. | 382/165 |
| 6,130,617 A | 10/2000 | Yeo | 340/575 |
| 6,154,566 A * | 11/2000 | Mine et al. | 382/219 |
| 6,532,301 B1 * | 3/2003 | Krumm et al. | 382/170 |
| 6,611,622 B1 * | 8/2003 | Krumm | 382/170 |
| 6,718,050 B1 | 4/2004 | Yamamoto | 382/117 |
| 6,873,714 B1 | 3/2005 | Witt et al. | 382/118 |

(Continued)

FOREIGN PATENT DOCUMENTS

EP 1 011 064 A2 6/2000

OTHER PUBLICATIONS

Nikolaidas, A. et al., "Facial feature extraction using Adaptive Hough Transform, template matching and active contour models"; In Proc. Of 13[h] Int. Conf. on Digital Signal Processing (DSP '97), vol. 2, Santorini, Greece, Jul. 2, 1997, pp. 865-868.

(Continued)

*Primary Examiner*—Andrew W. Johns
(74) *Attorney, Agent, or Firm*—Fitzpatrick, Cella, Harper & Scinto

(57) ABSTRACT

For a subset of pixels in an image in which it is desired to detect a human face if one is present, a first variable is derived from the gray-level distribution of the image, and a second variable is derived from a preset reference distribution that is characteristic of the object. The correspondence between the first variable and the second variable is then evaluated over the subset of pixels, and a determination is made as to whether the image contains the object, based on the result of this evaluation.

17 Claims, 28 Drawing Sheets

U.S. PATENT DOCUMENTS

| | | | |
|---|---|---|---|
| 6,876,754 B1 | 4/2005 | Kellner | 382/103 |
| 2002/0114495 A1 | 8/2002 | Chen et al. | 382/117 |

OTHER PUBLICATIONS

Brunelli, R. et al., "Face Recognition: Features versus Templates"; IEEE Transactions on Pattern Analysis and Machine Intelligence, vol. 15, No. 10, Oct. 1993, pp. 1042-1052.

Wahl, F.M., "Digitale Bildsignalverarabeitung"; Springer-Verlag, 1984, submitted in English translationas "Digital image signal processing"; Artech House, Inc., © 1987.

Deng, J. et al., "Region-based Template Deformation and Masking for Eye-feature Extraction and Description", Pattern Recognition, vol. 30, No. 3, (1997), pp. 403-419.

Kervrann, C. et al., "Generalized Likelihood Ratio-based Face Detection and Extraction of Mouth Features", Pattern Recognition Letters 18, (1997), pp. 899-912.

Wu, H. et al., "Face Detection and Rotations Estimation Using Color Information", The 5 IEEE International Workshop On Robot and Human Communication, 1996, pp. 341-346.

Wu, H. et al., "Face Detection From Color Images Using a Fuzzy Pattern Matching Method", IEEE Transactions On Pattern Analysis and Machine Intelligence, vol. 21, No. 6, Jun. 1999, pp. 557-563.

Lam, K., "A Fast Approach For Detecting Human Faces In a Complex Background", Proceedings of the 1998 International Symposium On Circuits and Systems, 1998, ISCAS '98, vol. 4, pp. 85-88.

Yang, G., et al., "Human Face Detection in a Complex Background", Pattern Recognition, vol. 27, No. 1, (1994), pp. 53-63.

* cited by examiner

IMAGE PROCESSING METHODS AND APPARATUS FOR DETECTING HUMAN EYES, HUMAN FACE, AND OTHER OBJECTS IN AN IMAGE

RELATED APPLICATION

This application is a division of application Ser. No. 09/951,458, filed Sep. 14, 2001, now U.S. Pat. No. 6,965,684, the entire disclosure of which is hereby incorporated herein by reference.

BACKGROUND OF THE INVENTION

1. Field of the Invention

The present invention relates to an image processing method, apparatus, and system for determining the human face in an image, and a storage medium.

2. Background of the Invention

Image processing method for detecting or extracting a feature region of a given image is very useful. For example, it can be used to determine the human face(s) in a given image. It is very useful to determine the human faces in an image, especially in an image with a complex background. Such a method can be used in many fields, such as telecommunication conferences, person-to-machine interface, security checking-up, monitor system for tracking human face, and image compression, etc.

It is easy for a human being (an adult or a baby) to identify human face in an image with a complex background. However, no efficient way has been found out to detect human face(s) in an image automatically and quickly.

Determining whether a region or a sub-image in an image contains a human face is an importing step in the human face detection. At present, there are many ways for detecting human face. For example, a human face can be detected by making use of some salient features (such as two eyes, the mouth, the nose,.etc.) and the inherent geometric positional relations among the salient features, or making use of the symmetric characters of human face, complexion features of human face, template matching and neural network method, etc. For instance, a method is described in Haiyuan Wu, "Face Detection and Rotations Estimation using Color Information.", the 5th IEEE International Workshop on Robot and Human Communication, 1996, pp 341–346, in which a method is, given for utilizing human face features (two eyes and the mouth) and relations among the features to detect human face. In this method, the image region to be determined is first studied to find out whether the needed human face features can be extracted. If yes, then the matching degree of the extracted face human features to a known is human face model investigated, wherein the human face model describes the geometric relations among the human face features. If the matching degree is high, the image region is supposed to be an image of a human face. Otherwise, it is determined that the image region does not contains a human face. However, the method relies too much on the quality of the image to be investigated, and it is too much influenced by, lighting conditions, the complexity of the image's background and the human race difference. Especially, it is very hard to determine human face exactly when the image quality is bad.

There have been other prior art disclosures regarding human face detection, such as:

1. "Region-Based Template Deformation And Masking For Eye-Feature Extraction And. Description", JYH-YUAN DENG and PEIPEI LAI, Pattern Recognition, Vol. 30, No. 3, pp. 403–419,1997;
2. "Generalized likelihood ratio-based face detection and extraction of mouth features", C. Kervrann, F. Davoine, P. Perez, R. Forchheimer, C. Labit, Pattern Recognition Letters 18 (1997)899–912;
3. "Face Detection From Color Images Using a Fuzzy Pattern Matching Method", Haiyuan Wu, Qian Chen, and. Masahiko Yachida, IEEE Transactions On Pattern Analysis And Machine Intelligence, Vol. 21, No 6, June 1999;
4. "Human Face Detection In a Complex Background", Guangzheng Yang and Thomas S. Huang, Pattern Recognition, Vol. 27, No. 1, pp. 53–63. 1994;
5. "A Fast Approach for Detecting Human faces in a Complex Background", Kin-Man Lam, Proceedings of the 1998 IEEE International, Symposium on Circuits and System, 1998, ISCAS'98 Vol. 4, pp 85–88.

SUMMARY OF THE INVENTION

It is an aim of the present invention to provide an improved image processing method, apparatus and storage medium for detecting objects in an image with a gray-level distribution.

It is a further aim of the present invention to provide an improved image processing method, apparatus, and storage medium. Said image processing method and apparatus can detect an object in a given image quickly and effectively.

In the present invention, a method for determining an object in an image having a gray-level distribution is provided, which is characterized in that said method comprises the steps of:

for a subset of pixels in the image, deriving a first variable from said gray-level distribution of said image, for said subset of pixels, deriving a second variable from a preset reference distribution, said reference distribution being characteristic of said object;

evaluating the correspondence between said first variable and said second variable over the subset of pixels;

determining if said image contains said object based on the result of the evaluation step.

Further, in the present invention, a method for determining an object in an image having a gray-level distribution is provided, said method comprises the steps of:

a) determining a sub-image in the image;
b) selecting a subset of pixels based on the sub-image;
c) deriving a first variable from said gray-level distribution of said image;
d) for said subset of pixels, deriving a second variable from a preset reference distribution, said reference distribution being characteristic of said object;
e) evaluating the correspondence between said first variable and said second variable over the subset of pixels;
f) determining if said image contains said object based on the result of the evaluation step.

In the present invention, object detection is carried out by evaluating two vector fields, so that adverse and uncertain effects such as non-uniform illumination can be eliminated, the requirement of the method of the present invention on the quality of the image is lowered, while the varieties of images that can be processed with the method of the present invention are increased. Moreover, gradient calculation is relatively simple, thus reducing the time needed for performing the detection.

As a specific embodiment of the invention, a sub-image, in which a target object (such as a human face) is to be detected, is determined by detecting one or more characteristic features (such as a pair of dark areas which are expected to be human eyes) in the image, providing an effective way for detecting a predetermined object(s) in the image.

As a specific embodiment, the method of the present invention limits the evaluation of correspondence between two vector fields in an area within the part of image to be detected, such as an annular area for human face detection, in which the correspondence between the two vector fields is more obvious, thus allowing the evaluation of the correspondence becoming more effective while reducing the time needed for carrying out the detection.

As a further embodiment, the method of the present invention performs a weighted statistical process during the evaluation, allowing the pixels with larger gradient (i.e. more obvious characteristic feature) have greater contribution to the outcome of the evaluation, thereby making the detection more effective.

As a further embodiment, the method of the present invention uses both weighted statistical process and non-weighted statistical process and determine if an object is included in the image to be detected on the basis of the results of both the processes, thus increasing the accuracy of the detection.

Also, the foregoing aim of the present invention is achieved by providing an image processing method for detecting an object in an image, comprising:

setting a rectangular region in the image;

setting an annular region surrounding the rectangular region;

calculating the gradient of gray level at each pixel in said annular region;

determining a reference gradient of each pixel in the annular region; and determining if said object is contained in said rectangle on the basis of the gradient of the gray level and the reference gradient at each pixel in said annular, region.

Further, the foregoing aim of the present invention is achieved by providing an image processing apparatus for determining a feature portion in an image, comprising:

means for determining a rectangular region to be detected in the image;

means for setting an annular region surround said rectangular region;

means for calculating the gradient of gray level at each pixel in said annular region;

means for calculating a reference gradient for each pixel in the annular region; and means for determining if said object is contained in said rectangular region on the basis of the gradient of the gray level at each pixel and the reference gradient at each pixel in said annular region.

Moreover, the present invention provides a storage medium with a program code for object-detection in an image with a gray-level distribution stored therein, characterized in that said program code comprises:

codes for determining a sub-image in said image;

codes for selecting a subset of the pixels in said sub-image;

codes for deriving, for said subset of pixels, a first variable from said gray-level distribution of said image, codes for deriving, for said subset of pixels, a second variable from a preset reference distribution, said reference distribution being characteristic of said object;

codes for evaluating the correspondence between, said first variable and said second variable over the subset of pixels; and codes for determining if said image contains said object based on the result of the evaluation step."

Moreover, the present invention provides a human eye detecting method for detecting human eyes in an image, comprising:

a read step of reading the gray level of each pixel in the each column in the image;

a segmenting step of segmenting each column into a plurality of intervals, and labeling each of the intervals as valley region, intermediate region or peak region;

a merging step of merging the valley region of the each column and the valley region of its adjacent column, and generating an eye candidate region; and a determination step of determining the human eye from the eye candidate regions.

The other objects and features of the present invention will become apparent from the following embodiments and drawings. The same reference numeral in the drawings indicates the same or the like component.

BRIEF DESCRIPTION OF THE DRAWINGS

The accompanying drawings, which are incorporated herein and constitute a part of the specification, illustrate embodiments of the invention and, together with the description, serve to explain the invention.

DESCRIPTION OF THE PREFERRED EMBODIMENTS

Preferred embodiments of the present invention will now be described in detail with reference to the accompanying drawings.

Figure 1:
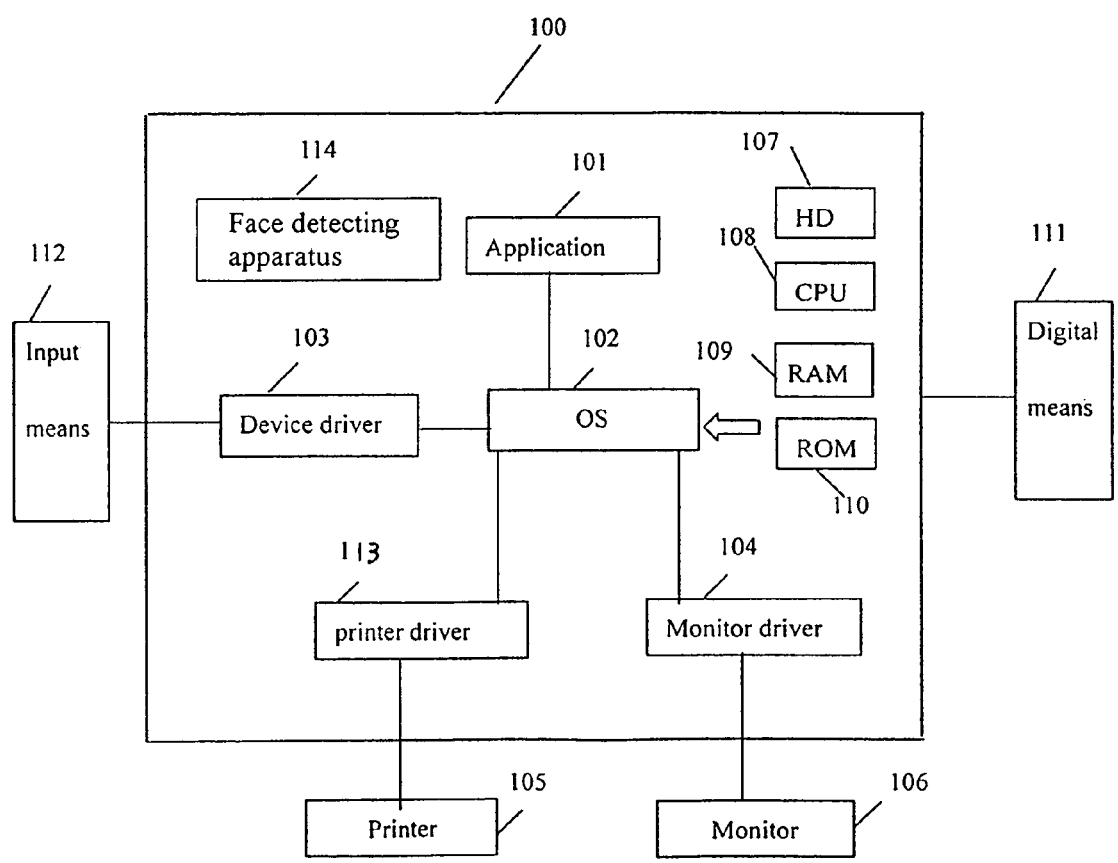
FIG. 1 is a block diagram showing an embodiment of the image processing system of the present invention.

FIG. 1 is a block diagram showing an image processing system utilizing an image processing apparatus of the present invention. In the system, a printer 105, such as an ink jet printer or the like, and a monitor 106 are connected to a host computer 100.

Operating on the host computer 100 are an application software program 101 such as a word-processor, spreadsheet, Internet browser, and the like, an OS (Operating System) 102, a printer driver 103 for processing various drawing commands (image drawing command, text drawing command, graphics drawing command) for instructing the output of images, which are issued by the application software program 101 to the OS 102 for generating print data, and a monitor driver 104 for processing various drawing commands issued by the application software program 101 and displaying data in the monitor 106.

Reference numeral 112 denotes an instruction input device; and 113, its device driver. For example, a mouse that allows a user to point to and click on various kinds of information displayed on the monitor 106 to issue various instructions to, the OS: 102 is connected. Note, that other pointing devices, such as trackball, pen, touch panel, and the like, or a keyboard may be connected in place of the mouse.

The host computer 100 comprises, as various kinds of hardware that can ran these software programs, a central processing unit (CPU) 108, a hard disk (HD) 107, a random-access memory (RAM) 109, a read-only memory (ROM) 110, and the like.

An example of the face detection system shown in FIG. 1 may comprises Windows. 98 available from Microsoft Corp. installed as an OS in a PC-AT compatible personal computer available from IBM Corp., desired application program(s) installed, that can implement printing and a monitor, and a printer connected to the personal computer.

In the host computer 100, each application software program 101 generates output image data using text data (such as characters or the like), graphics data, image data, and so forth. Upon printing out the output image data, the application software program 101 sends a print-out request to the OS 102. At this time, the application software program 101 issues a drawing command group that includes a graphics drawing command corresponding to graphics data and an image drawing command corresponding to image data to the OS 102.

Upon receiving the output request from the application software program 101, the OS 102 issues a drawing command group to the printer driver 103 corresponding to an output printer. The printer driver 103 processes the print request and drawing commands inputted from the OS 102, generates print data for the printer 105, and transfers the print data to the printer 105. The printer driver 103 performs an image correction process for the drawing commands from OS 102, and then rasterizes the commands sequentially on a memory, such as a RGB 24-bit page memory. Upon completion of rasterization of all the drawing command, the printer driver 103 converts the contents of the memory into a data format with which the printer 105 can perform printing, e.g., CMYK data, and transfers the converted data to the printer 105.

Note that the host computer 100 can connect a digital camera 111, that senses an object image and generates RGB image data, and can load and store the sensed image data in the HD 107. Note that the image data sensed by the digital camera 111 is encoded for example by JPEG. The sensed image data can be transferred as image, data to the printer 105 after it is decoded by the printer driver 103.

The host computer 100 further comprises a face detection apparatus 114 for determining the human face in an image. The image data stored in HD 107 (or other memory) are read and processed by the face detection apparatus 114. First, the possible positions of the human face region are determined and read, and whether the region contains one or more human faces is determined. Then, the portion(s) of the image that contains the determined human face(s) in the image can be sent to the printer 105 or monitor 106 under the control of OS 102.

Face Detection Apparatus

Figure 2:
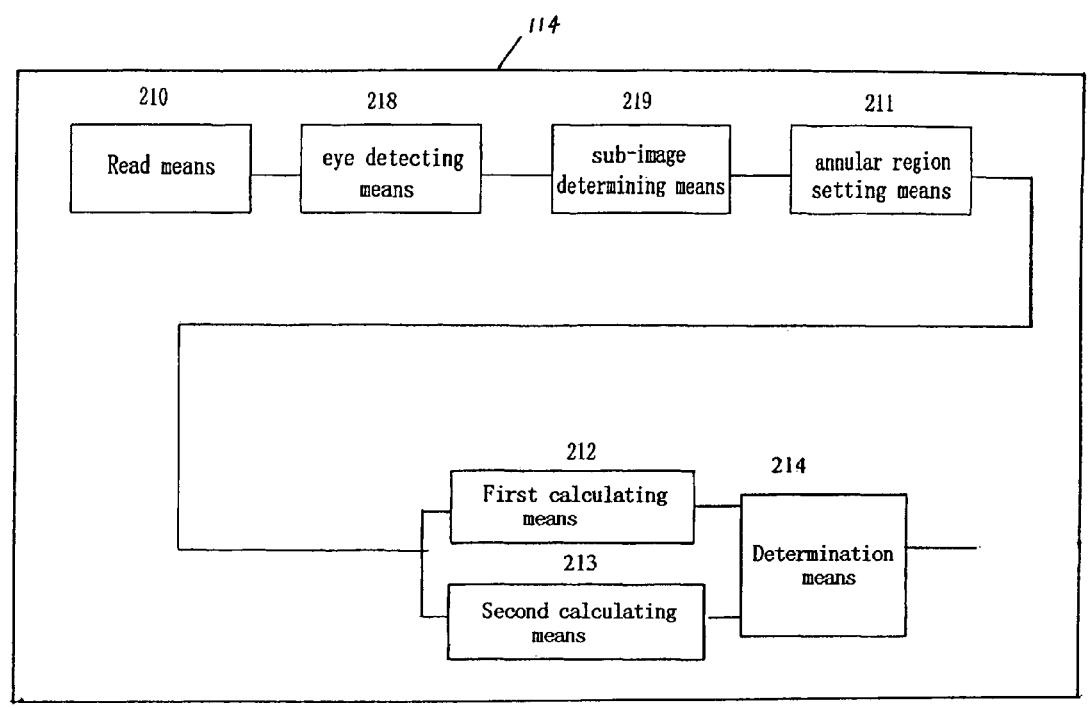
FIG. 2 is a block diagram showing an embodiment of an arrangement of human face detection apparatus according to the present invention.

FIG. 2 is a block diagram showing the arrangement of the face detection apparatus according to the present invention.

The face detection apparatus 114 of the present embodiment comprises a reading means 210, an eye area detecting device 218, a' sub-image determining device 219, an annular region setting means 211, a first calculating means 212, a second calculating means 213, and a determination means 214. In the face detection apparatus 114, a reading means 210 executes an image reading process. The gray level of each pixel of an image stored in the HD 107 or the RAM 109 or the like is read by the reading means 210.

Human Face Detection Process

Figure 3:
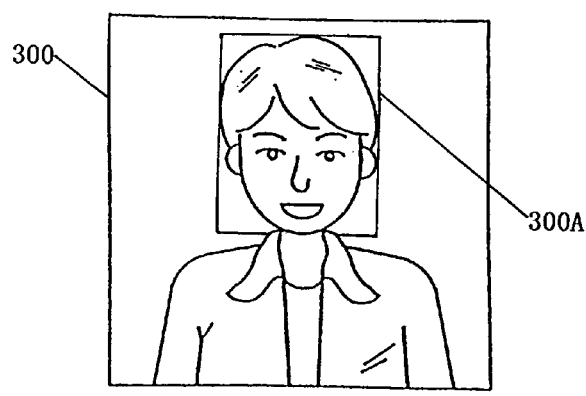
FIG. 3 schematically shows an original image to be detected.

FIG. 3 schematically shows an example of an original image to be detected. The original image contains a human face. The original image 300 can be input to the human face detection system by a digital device 111 such as a digital camera, a scanner or the like, and the original image is stored in the HD 107 or the RAM 109, or the like.

Referring to FIG. 3, it can be seen that the shape of the human face contour in the original image 300 is generally closed to an ellipse, which has nothing to do with human race, complexion, age and gender. Along the human face contour, a circumscribed rectangular region 300A can be drawn.

Figure 4:
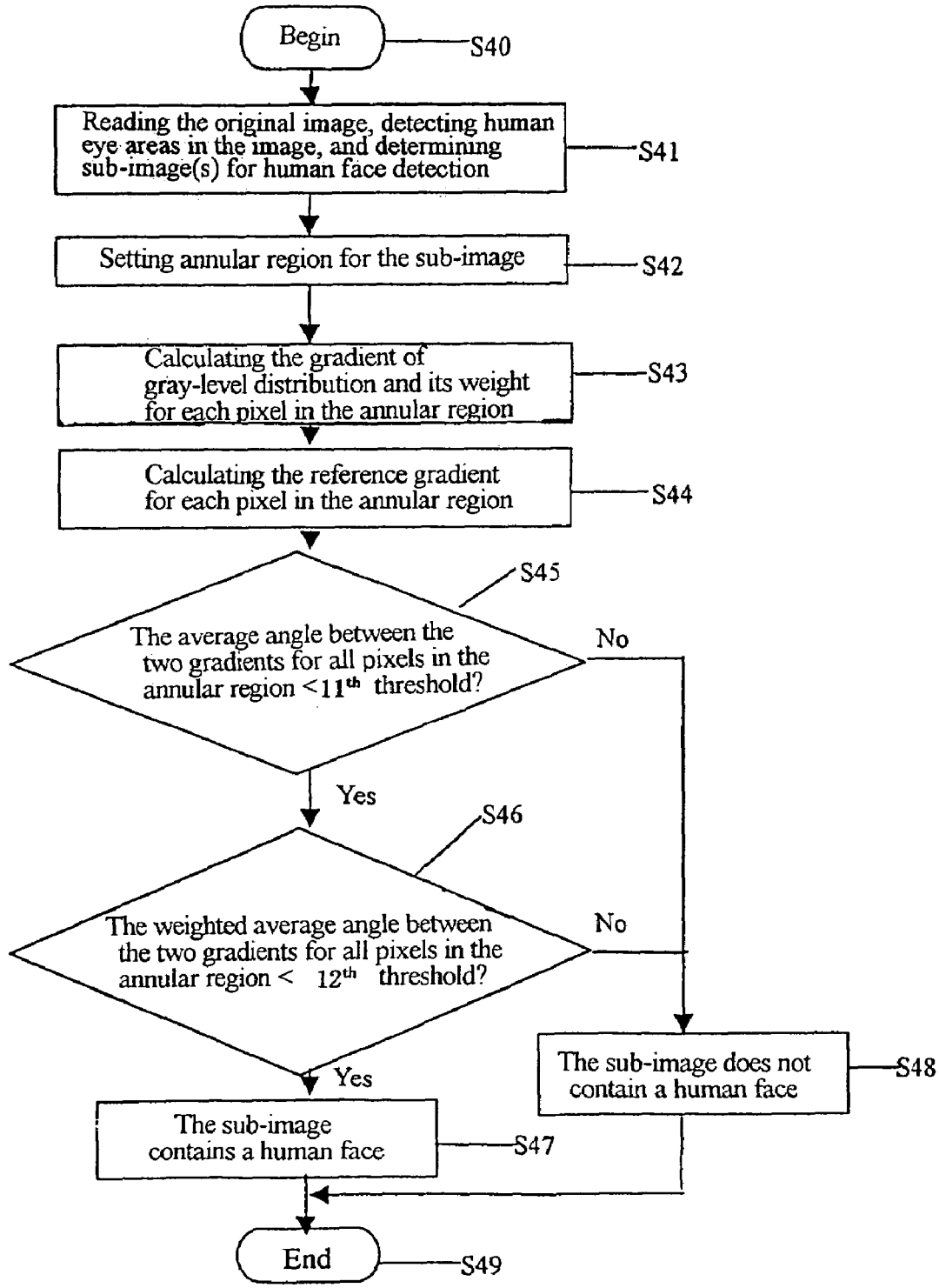
FIG. 4 is a flow chart showing a human face detecting process according to the first embodiment of the present invention.

FIG. 4 is a flow chart for showing a human face detection process according to an embodiment of the present invention.

Referring to the flow charts in FIG. 4 and FIG. 3, an explanation to human face detection process for the original image will be given.

Reading Original Image and Determining Sub-Image (Rectangular Region) to be Detected Referring to FIG. 4, the human face detection process starts in step S40. In step S41, reading means 210 reads an original image 300 to be detected, and acquires the gray level of each pixel of the original image 300. If the original image 300 is encoded by, e.g., JPEG, the reading means 210 must first decode it before reads its image data. In step S41, the sub-image determining device 219 determines one or more sub-images (or regions) 300A in the original image 300 for human face detection, and it also determines the location of the sub-image 300A in the original image 300. The sub-image 300A can be substantially rectangular and is the candidate region of a human face image portion. However, the shape of the sub-image is not limited to rectangular but can be any other suitable shape.

A method and device, in accordance with the present invention, for determining sub-images) 300A in an image for detection are described below. It is to be noted, however, that the manner of eye area detection for determining the sub-image is not limited to the method of the present invention as described below. Instead, other methods and/or processes, as those known in the art, can be utilized for determining the sub-image.

Determination of Sub-Image 300A

Eye Detecting Device

Figure 12:
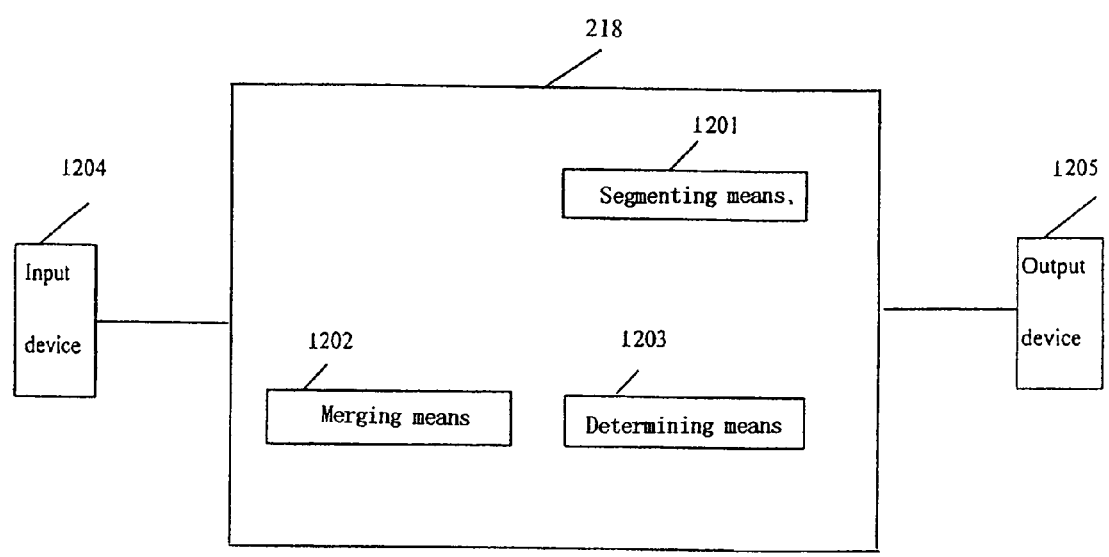
FIG. 12 is a block diagram showing the arrangement of an eye detecting device according to an embodiment of the present invention.

FIG. 12 is a block diagram showing the arrangement of the eye-detecting device according to the an embodiment of the present invention.

Figure 14B:
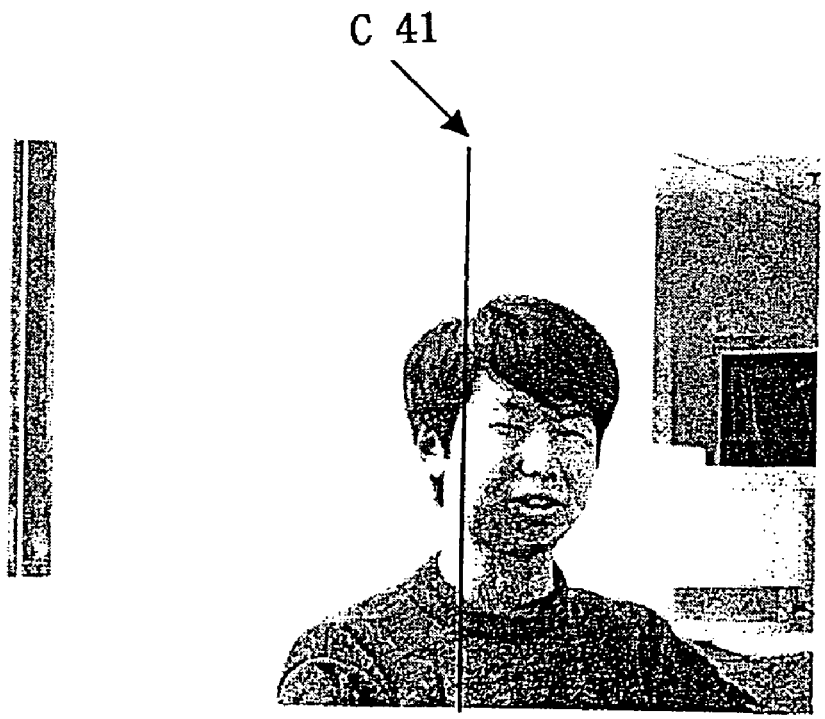
FIG. 14B is an example for showing a column of pixels in an image.

The eye detecting device 218 of the present embodiment comprises a segment means 1201, a merger means 1202 and a determination means 1203. Referring to FIGS. 14D and 14E, on the basis of the gray level of each pixel in a column C41 of an image, the column C41 of an image is segmented into a plurality of intervals I1-1, I1-2, . . . . I1-9, I-10 by segment means 1201. These intervals I1-1, I1-2, . . . I1-9, I1-10 can be classified into three types: peak regions, valley regions and intermediate regions, according to the average gray level of the pixels in them.

The terms "peak region, valley region and intermediate region" will be defined in detail later. Then, the valley regions of column C41 can be obtained. In the same way, the segment means 1201 also divides other columns of the image into the three types and obtains their valley regions respectively. After all the columns of an image have been marked as the three types and their valley regions have been obtained, the merger means 1202 executes the merging process and merges the valley regions in the adjacent columns. The merged valley regions are set as the human eye candidates. Then the human eye can be determined by determination means 1203.

Detecting the Eye Areas

A human eye detecting process for an original image will be explained below with reference to the flow chart in FIG. 13A. FIG. 13B is an example of an original image to be detected. Assume that the original image is stored in a predetermined area in the HD 107 or the RAM 109, or the like.

Figure 13A:
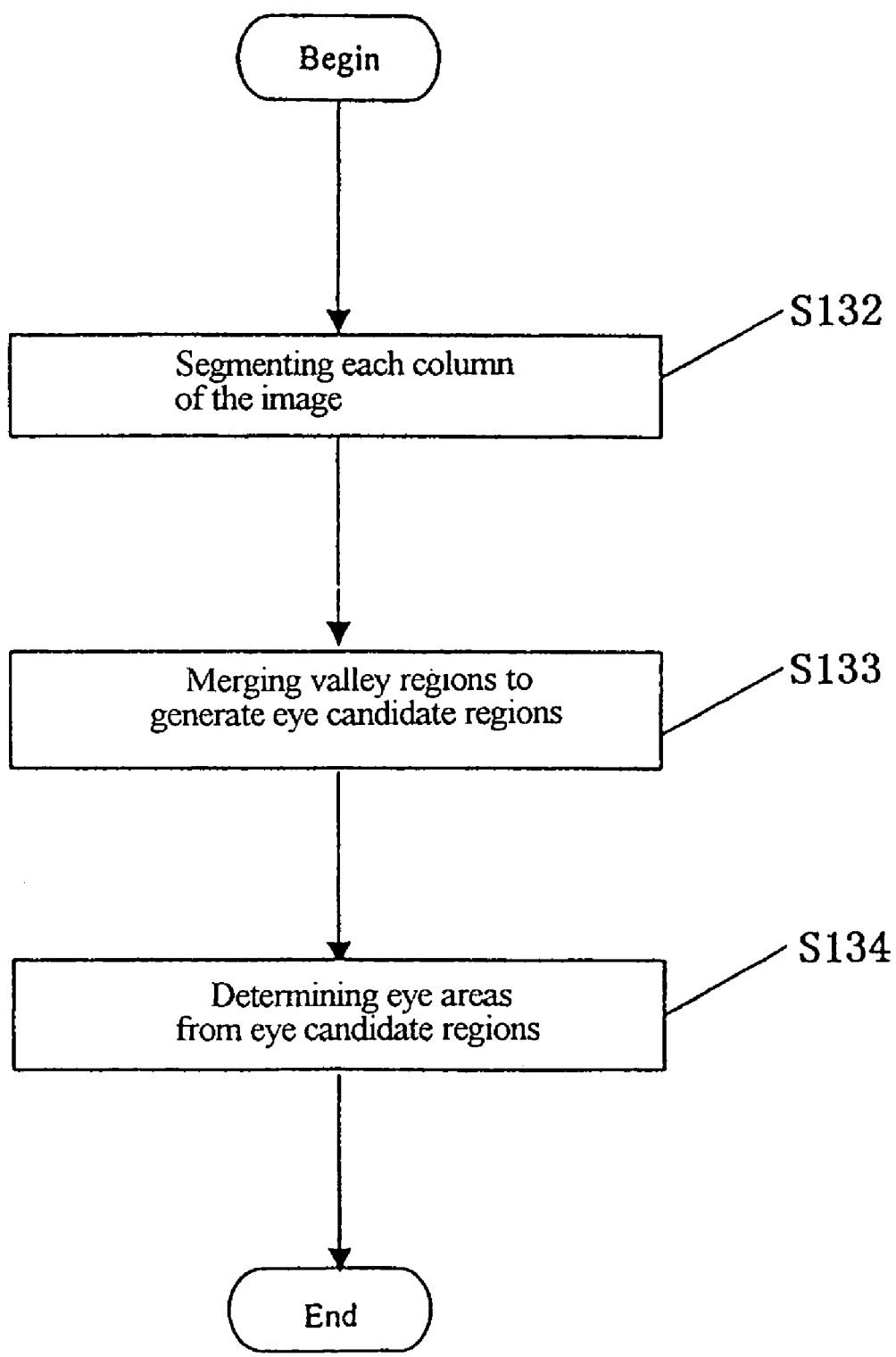
FIG. 13A is a flow chart showing the procedure of searching human eye areas.
Figure 13B:
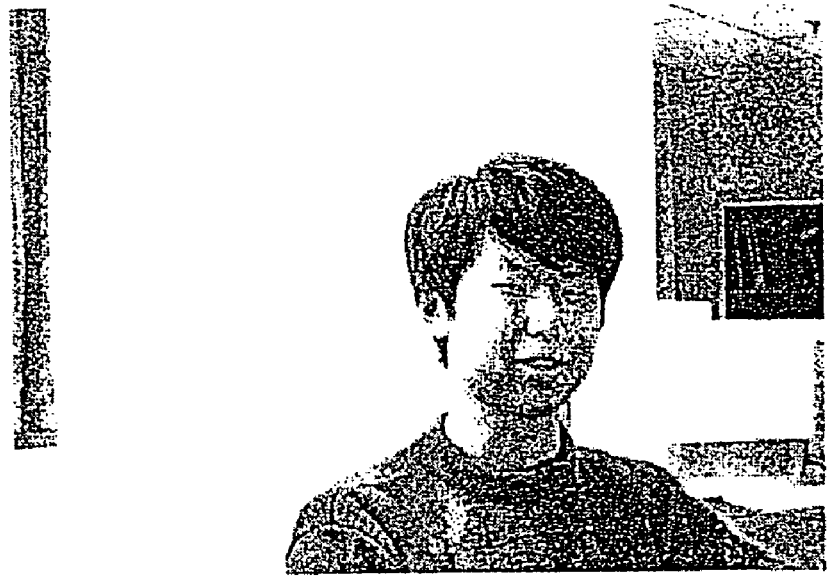
FIG. 13B is an example of an original image to be detected.

Referring to FIG. 13A, in step S132, each column of the original image is segmented into many intervals by the segment means 1201. With reference to FIG. 14E, the length of each of the intervals I1-1, I1-2, . . . I1-9 and I1-10 is variable. For example, the length of interval I1-1 is not equal to the length of interval I1-2. Some of the segmented intervals are marked as the valley regions on the basis of their average gray levels of pixels. In step S133, the valley regions in the adjacent columns are merged by the merger means 1202 to generate the eye candidate regions. Since the valley regions in each column have different lengths, the sizes of the eye candidate regions are also different from each other. In step S134, the human eye areas in the eye candidate regions are determined by the determination means 1203. Thus, areas corresponding to human eyes in the image can be detected.

Segmenting Each Column of an Image

Figure 14A:
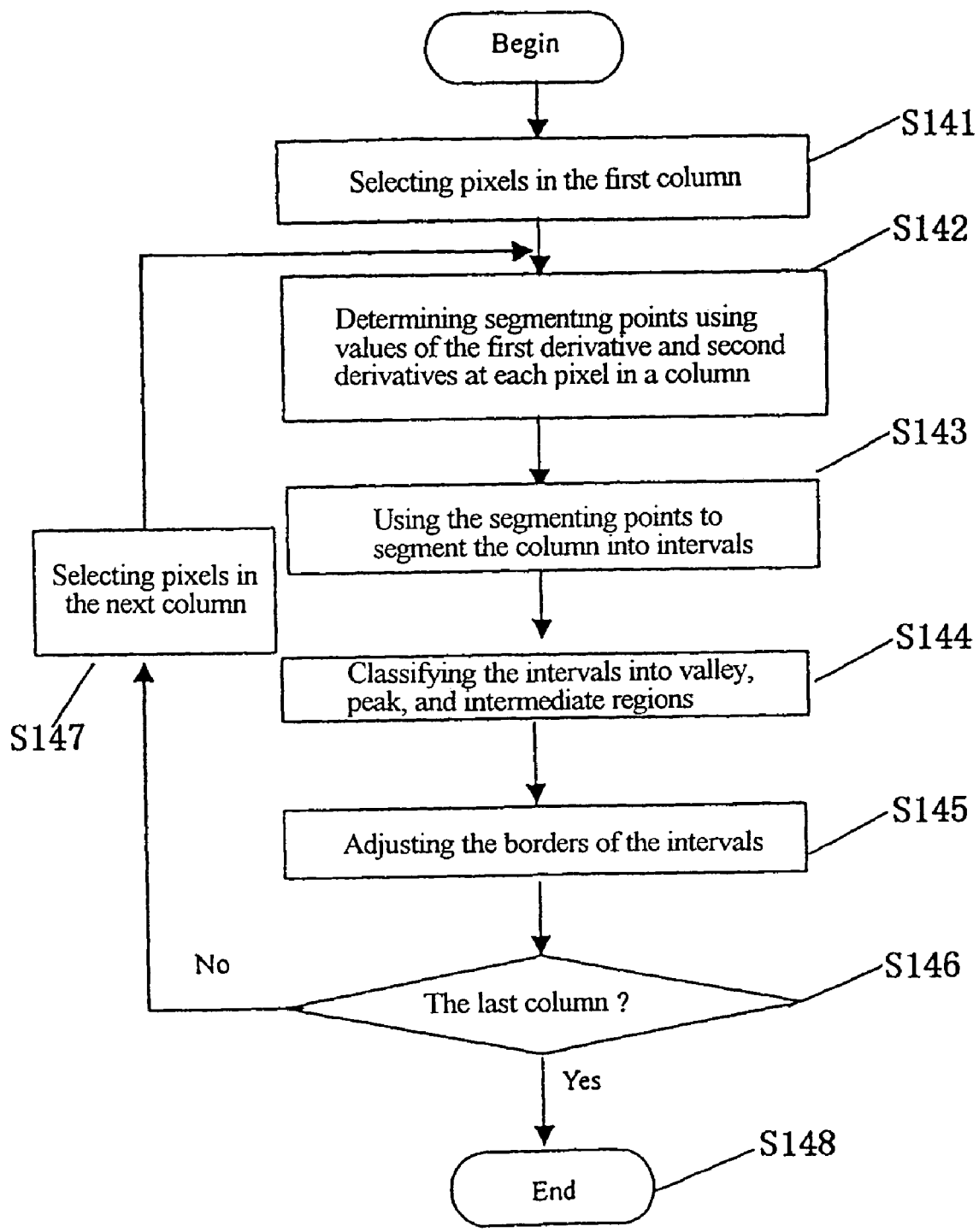
FIG. 14A is a flow chart for segmenting every each column in an image.

FIG. 14A is the flow chart showing the process for segmenting each column in an image in step S132.

The terms "valley region", "peak region" and "intermediate region" are defined as below.

Figure 14C:
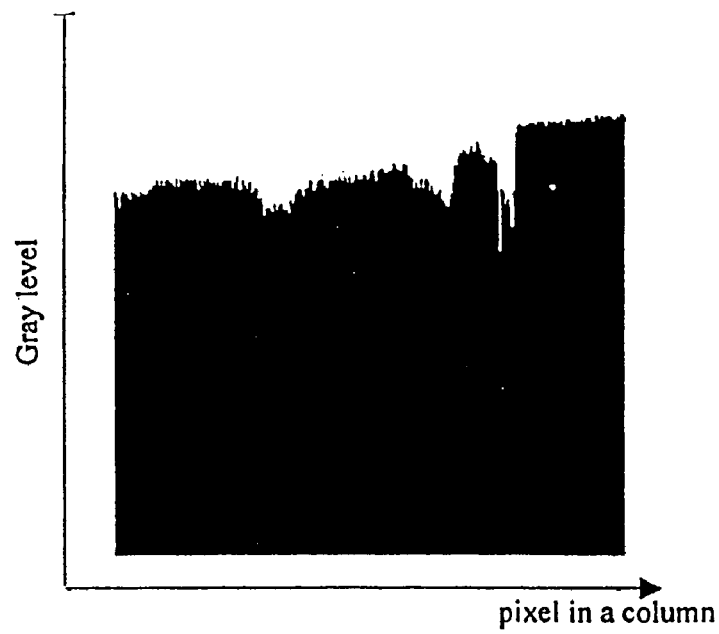
FIG. 14C is an example for showing the gray level distribution of a column.
Figure 14D:
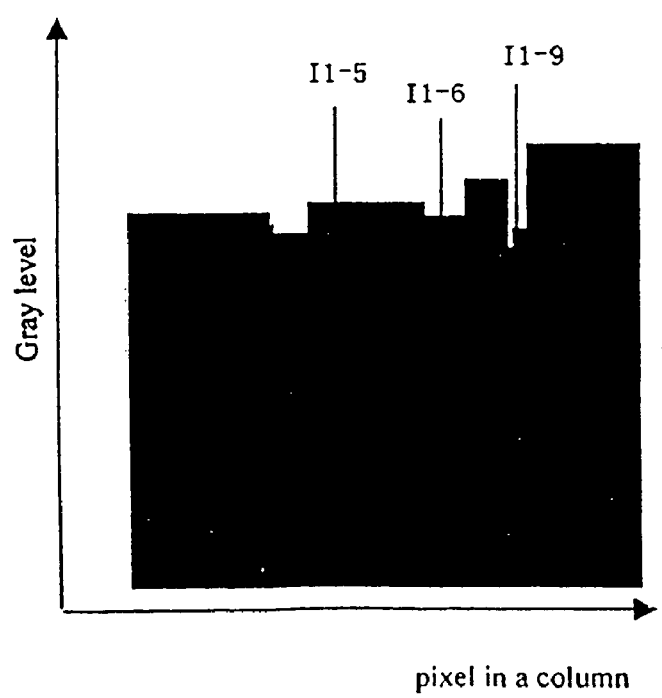
FIG. 14D is a diagram showing the gray level of a column segmented into intervals.
Figure 14E:
FIG. 14E is an example for showing a segmented column in an image.

FIG. 14B is an example for showing a column in the image. Referring to FIG. 14B, a column C41 of the original image is read by the reading means 200. FIG. 14C shows a gray level distribution of the column C41. FIG. 14D is a gray level distribution of the column segmented into intervals. In FIG. 14D, the reference numerals I1-5, I1-6, I1-9 denote the segmented intervals, respectively, and the gray level of each of the segments or intervals is the average of the gray levels of pixels in the same segment or interval in FIG. 14C.

FIG. 14E is the segmented column of the image in FIG. 14B. Referring to FIG. 14E, the image data of a column C41 in the image is read by reading means 1200. For the image of FIG. 14B, the column C41 is segmented into 10 intervals I1-1, I1-2, . . . I1-9 and I1-10. An interval's size is the number of the pixels in the interval. For example, if the interval I1-2 comprises 12 pixels, the interval I1-2's size is 12.

With reference to FIG. 14D, and 14E, if an interval's gray level is less than both of its adjacent intervals' gray level, then the interval is called a valley region. If an interval's (average) gray level is bigger than both of its adjacent intervals' gray level, the interval is called a peak region. On the other hand, if an interval's gray level is between its adjacent interval's gray levels, such an interval is called an intermediate region. As to column C41 of the embodiment, the gray levels of intervals from I1-1 to I1-10 are 196, 189, 190, 185, 201, 194, 213, 178, 188, and 231 respectively. As, to interval I1-6, its gray level is 194, and the gray levels of its adjacent intervals I1-5 and I1-7 are 201 and 213 respectively. Since the gray level of interval I1-6 is less than that of its adjacent intervals I1-5 and I1-7, the interval I1-6 is determined as a valley region. In the same way, intervals I1-2, I1-4 and I1-8 are also determined as valley regions. As to interval I1-5, its gray levelis 201, and the gray levels of its adjacent intervals are 185 and 194 respectively. Since the gray level of interval I1-5 is bigger than that of its adjacent intervals I1-6 and I1-7, the interval I1-5 is determined as a peak region. In the same way, intervals I1-1, I1-3, I1-7 and I1-10 are also determined as peak regions. Further, as to interval I1-9, its gray level is 188, the gray levels of its adjacent I1-8 and I1-10 are 178 and 231. Since the gray level of interval I1-9 is between the gray levels of its adjacent intervals I1-8 and I1-10, interval I1-9 is determined as an intermediate region.

As a valley region is also an interval, the ways for computing the valley region's gray level and size are the same as those for computing the interval's gray level and size. It is also applied to the computation of the gray level and size of a peak region or an intermediate region.

The process for segmenting every column in an image in step S132 will be explained below with reference to FIG. 14A.

Referring to FIG. 14A, the gray level of each pixel in the first column from the left of the detected image are read out in step S141. In order to segment the column into intervals of the three types, i.e., valley regions, peak regions and intermediate regions, the segmenting points have to be determined.

Figure 14F:
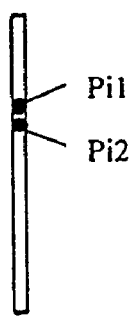
FIG. 14F is a diagram showing the determination of a segment point in a column.

In step S142, whether a pixel in the column is a segment point can be determined according to the values of first and second-order derivatives of the gray-level distribution at the pixel. FIG. 14F is, a diagram for showing the procedure to determine whether a pixel is a segmenting point in a column. With reference to FIG. 14F, two adjacent pixels Pi1 and Pi2 are given in a column.

Then, using any discrete derivative operator, the first and second-order derivatives at these two pixels Pi1, Pi2 are calculated. Assuming that the values of the first-order derivative at pixels Pi1 and Pi2 are represented by D1f and D2f respectively, and the values of the second-order derivative at pixels Pi1 and Pi2 are represented by D1s and D2s respectively, then if either of the following two conditions is true:

(D1s>0) and (D2s<0);

(D1s<0) and (D2s>0)

and either of the absolute values of D1f and D2f is bigger than a predetermined value—which is in the range of 6–15 but is preferably 8, then the pixel Pi1 is determined as a segmenting point. Otherwise, the pixel Pi1 is, not determined as a segmenting point.

Thus, the segmenting points s11, s12, . . . s19 can be obtained instep S142.

After the segmenting points in a column have been determined, the column can be segmented into a plurality of intervals in step S143. Then, in step S144, the intervals are divided into valley region, peak region and intermediate region in accordance with the gray levels of the intervals. The border of intervals is adjusted in step S145. The detail of step S145 will be described using detailed flow chart. In step 146, it is checked if all columns in the detected image have been segmented. If the column being segmented is not the last column of the detected image, the flow goes to step S147. In step S147, the gray levels of pixels in the next column are read out. Then the flow returns to step S142 to repeat the process in step S142 and the subsequent steps.

However, if the column being segmented is the last column of the detected image in step 146, i.e. all columns have been segmented, the flow ends in step S148.

Alternatively, the above-mentioned segmenting process may start from the first column from the right of the detected image.

Merging Valley Regions to Generate Eye Candidate Regions

Figure 15A:
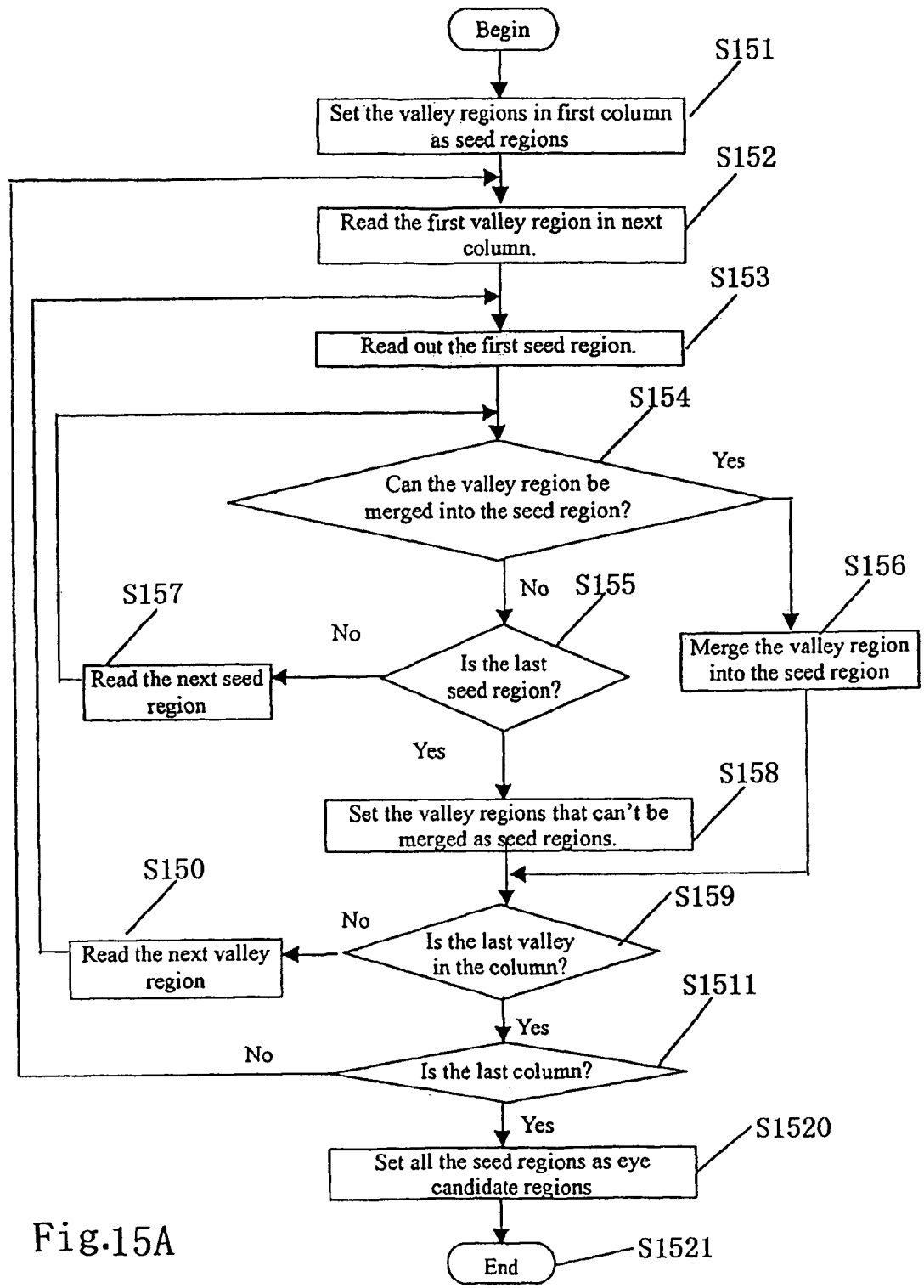
FIG. 15A is a flow chart showing the process for merging valley regions in the columns.
Figure 15B:
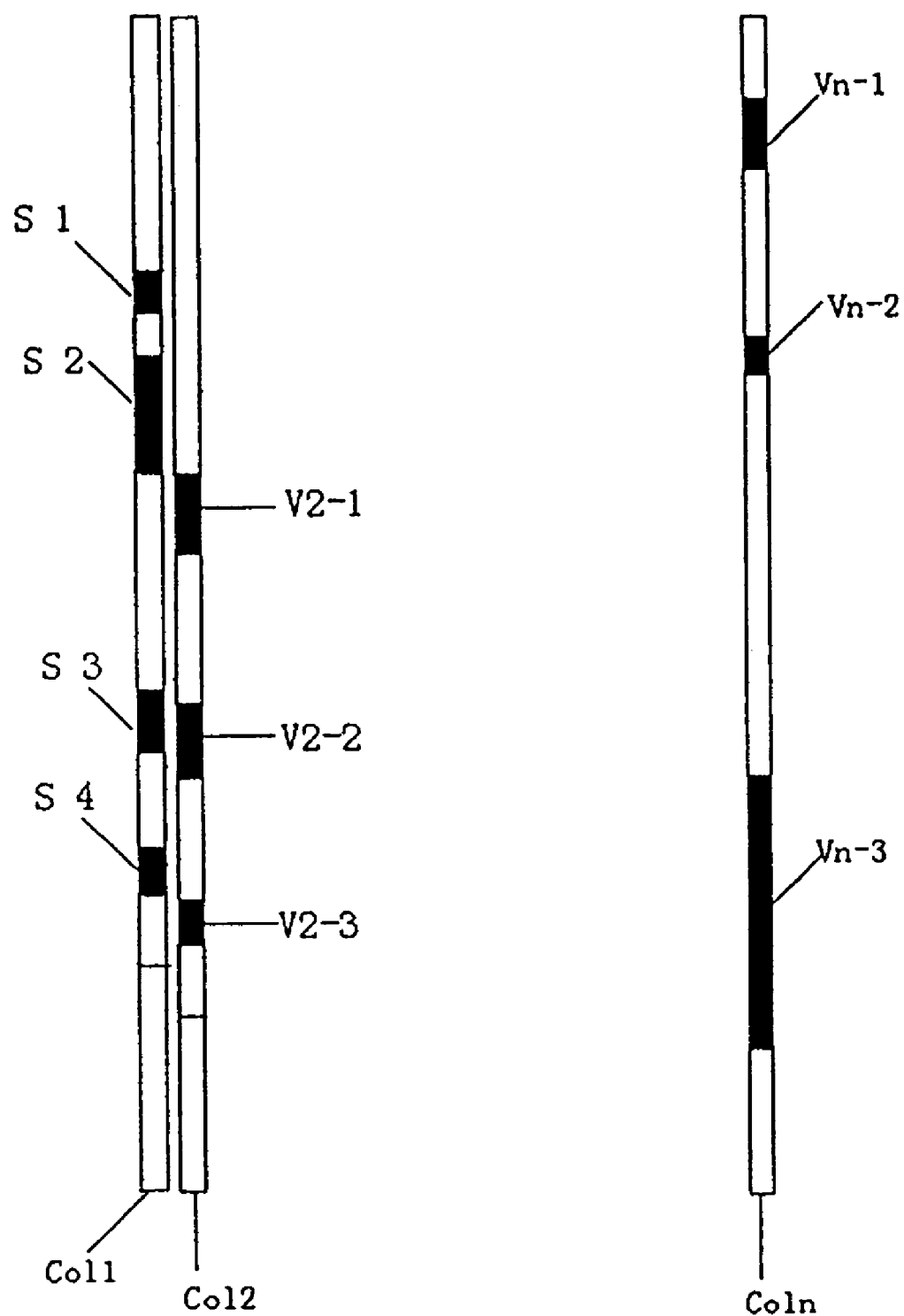
FIG. 15B is a diagram showing the columns in an image and the valley regions and the seed regions in each column.

FIG. 15A is the flow chart for showing the process of merging valley region in the columns in step S133 in FIG. 13A. FIG. 15B is a diagram showing the columns of an image and the valley regions and seed regions in each column of the image. In FIG. 15B, an image has n columns Col1, Col2, . . . Coln.

With reference to FIG. 15A and 15B, all the valley regions S1, S2, S3 and S4 in the first column Col1 (most left) of the detected image are set as seed regions in step S151. A seed region is an aggregation of one or more valley regions. Since the gray level of a valley region is less than that of a peak region or a intermediate region, a seed region is usually a dark area in a column.

In step S152 of FIG. 15A, the first valley region V2-1 in the next column Col2 is read out. Then the flow advances to step S153. In step S153, the first seed region S1 is read out. In step S154, it is checked if the valley region V2-1 of column Col2 can be merged into the seed region S1 on the basis of the valley region V2-1 and the seed region S1. If the valley region V2-1 of the valley region V2-1 can be merged into the seed region S1, then the flow goes to step S156 and the valley region V2-1 is merged into the seed region, then the valley region becomes a part of the seed region. However, if it is checked in step S154 that the valley region V2-1 can not be merged into the seed region S1, the flow goes to step S155. In the present example, valley region V2-1 of column Col2 can not be merged into seed region S1. The flow advances to step S155. In step S155, it is checked whether the seed region is the last seed region. If the seed region is not the last seed region, then next seed region is read out in step S157 and the flow returns to step S154 to repeat the processes in step S154 and the subsequent steps. In the present example, seed region SI is not the last seed region, so in step S157 the next seed region S2 is read out, and the steps of S154 and S155 are repeated. If it is checked in step S155 that the seed region is the last, seed region (for example, the seed region S4 as shown in FIG. 5B), then the flow advances to step S158 and set the valley region that can not be merged into a seed region as a new seed region. Referring to FIG. 15B, since valley region V2-1 of column Col2 can not be merged into seed regions S1, S2, S3 or S4, that is, it is a valley region that can not be merged into any existing seed region, then valley region V2-1 of column Col2 is set as a new seed region in step S158.

Figure 15C:
FIG. 15C is an image showing the detected candidate eye areas.

Instep S159, it is checked if all the valley regions in the column Col2 have been processed. If all the valley regions in the column Col2 have been processed, the flow goes to step S1511. In step S1511, it is checked if all the columns have been processed. If the column is not the last column of the detected image, then the flow returns to step S152 to repeat the processes in step S154 and the subsequent steps. As column Col2 is not the last column of the detected image, the flow returns to step S152. If all the columns have been processed, i.e., if the column is the last column Coln, the flow advances to step S1520. In step S1520, all the seed regions are set as eye candidate regions. Then the flow ends in step S1521. FIG. 15C is an example showing the result for merging valley regions to generate eye candidate regions in columns in a detected image in step S133.

Determining Eye Areas

Figure 16C:
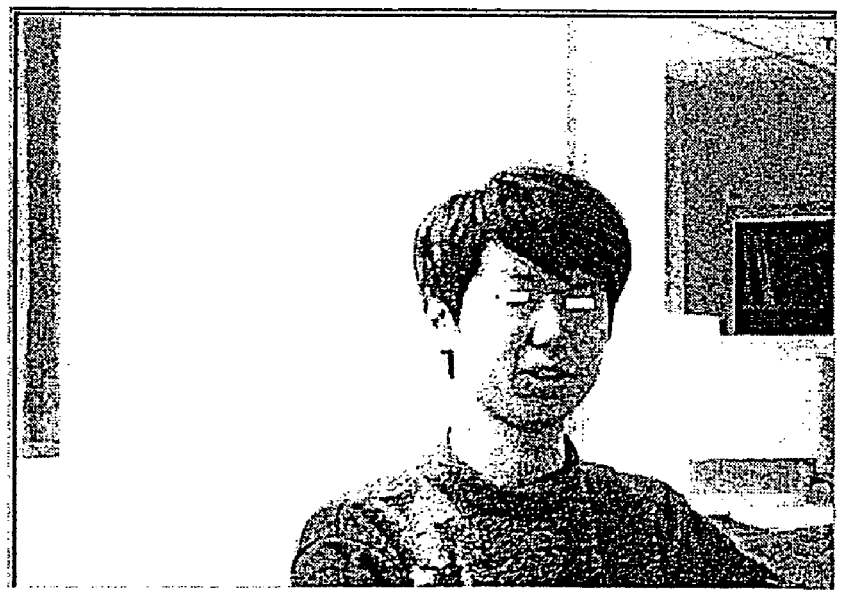
FIG. 16C is an image showing the detected eye areas.
Figure 16A:
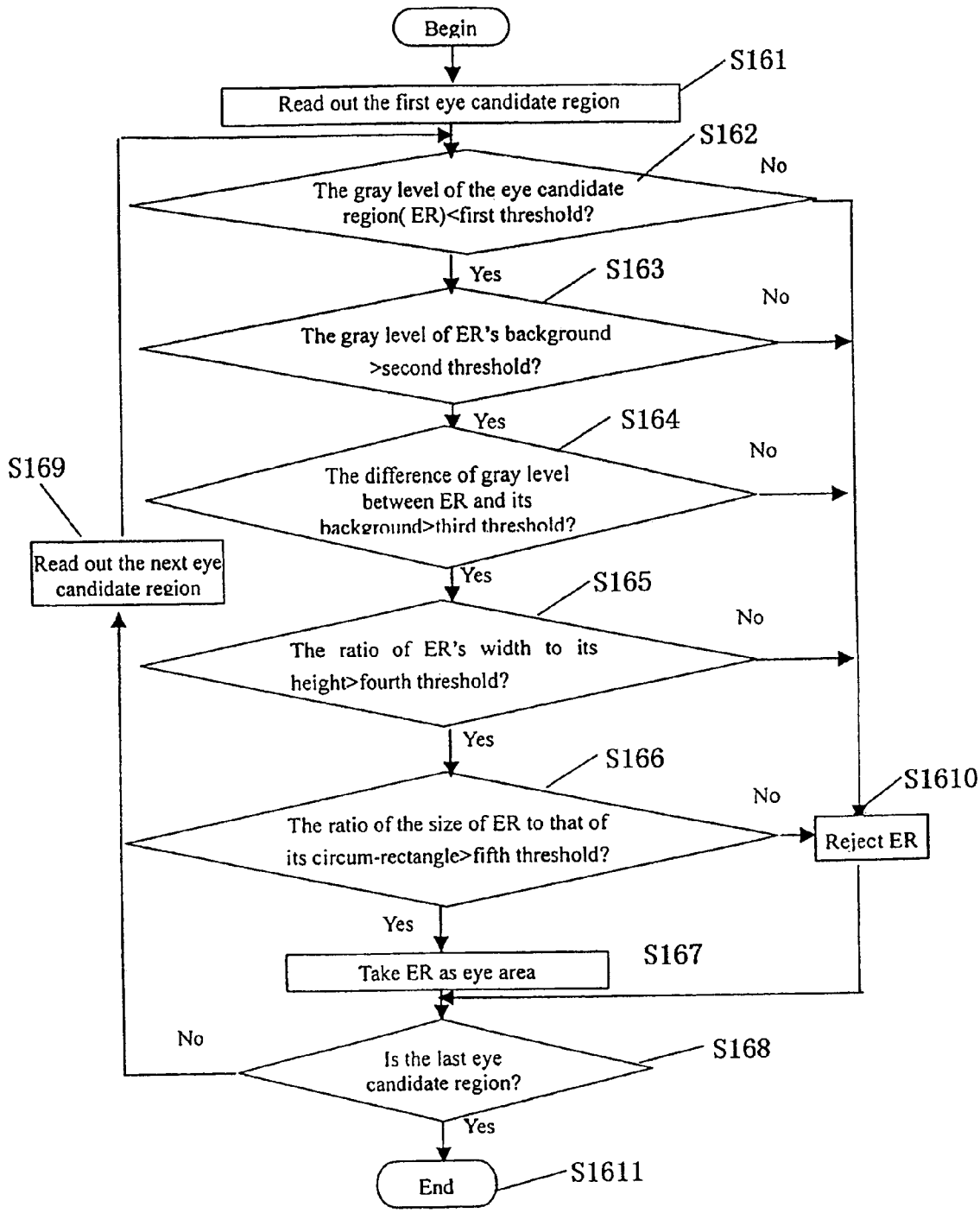
FIG. 16A is the flow chart showing the process for determining eye areas in accordance with the present invention.

FIG. 16A is the flow chart showing the process for determining eye areas in step S134.

With reference to FIG. 16A, the first eye candidate region is read out in step S161. Then, the flow advances to step S162. In step S162, the gray level of an eye candidate region is calculated. As described above, an eye candidate region comprises one or more valley regions. If an eye candidate region is comprised of n valley regions, i.e. valley region 1, valley region 2, . . . valley region n, then the eye candidate region's gray level calculated in step S162 is given by:

$$EyeGray1 = (Valley1Gray1 \times pixels\,1 + Valley2Gray1 \times pixels\,2 + ValleynGray1 \times pixels\,n)/Total\,Pixels \quad (1)$$

where

EyeGray1 is an eye candidate region's gray level;

Valley1Gray1 is the gray level of valley region 1, pixels is the number of pixels in valley region 1;

Valley2Gray1 is the gray level of valley region 2, pixels2 is the number of pixels in valley region 2;

ValleynGray1 is the gray level of valley region n, pixels n is the number of pixels in valley region n;

Total Pixels is the total number of the pixels included in an eye candidate region.

Therefore, if an eye candidate region comprises 3 valley regions with gray levels of 12, 20 and 30 respectively, and each of the valley regions has 5, 6, and 4 pixels respectively, then the gray level of the eye candidate region will be $(12 \times 5 + 20 \times 6 + 30 \times 4)/15 = 20$.

Referring to step S162 of FIG. 16A, the gray level of an eye candidate region is calculated. If the eye candidate region's gray level is not less than a first threshold (for example, 160), the flow goes to step S1610. In the present embodiment, the first threshold is within the range of 100 to 200. In step S1610, the eye candidate region is determined as a false eye area and is rejected. Then the flow goes to step S168. In step S168, it is checked if all the eye candidate regions in the detected image have been processed. If it is not the last eye candidate region, then the next eye candidate region will be read in step S169, then the flow returns to step S162 to repeat the processes in step S162 and the subsequent steps. However, if it is checked in step S168 that the eye candidate region is the last eye candidate region, then all eye candidate regions in the detected image have been determined, and the flow ends in step S1611.

At step S162, if the gray level of the eye candidate region is less than the first threshold, the flow advances to step S163.

The background gray level of the eye candidate region is calculated in step S163. The background gray levels of valley regions included in the eye candidate region determine the background gray levels of an eye candidate region. A valley region's background gray level is the average gray level of its adjacent intervals' gray levels. The eye candidate region's background gray level calculated in step S163 is given by:

$$EyeBGray1 = (Valley1BGray1 + Valley2BGray1 \ldots + ValleynBGray1)/n; \quad (2)$$

where

EyeBGary1 is an eye candidate region's background gray level;

Valley1BGray1 is the background gray level of valley region 1;

Valley2BGray1 is the background gray level of valley region 2 . . .

ValleynBGray1 is the background gray level of valley region n; and n is the number of valley regions included in an eye candidate region.

At step S163, the background gray level of an eye candidate region is calculated. If the eye candidate region's background gray level is not bigger than a second threshold (for example, 30) in step S163, the flow goes to step S1610. In the present embodiment, the second threshold is within the range of 20 to 80. For the present example, in step S1610, the eye candidate region is determined as a false eye area and is rejected. Then the flow goes to step S168.

At step S163, if the background gray level of the eye candidate region is bigger than the second threshold, the flow advances to step S164.

The difference of background gray level of the eye candidate region and the gray level of the eye candidate region is calculated in step S164. If the difference is not bigger than a third threshold (for example, 20), the flow goes to step S1610. In the present embodiment, the third threshold is within the range of 5 to 120. In step S1610, the eye candidate region is determined as a false eye area and is rejected. Then the flow goes to step S168.

At step, S163, if the difference of background gray level of the eye candidate region and gray level of the eye candidate region is bigger than the third threshold, the flow advances to step S165.

The ratio of the width to the height of an eye candidate region is calculated in step S165.

As to the height and the width of an eye candidate region, we have the following definitions. Valley region's size is the number of pixels included in a valley region. For example, if a valley region comprises 5 pixels, then the valley region's size is 5. The size of an eye candidate region is the sum of the sizes of the valley regions included in the eye candidate region. The width of an eye candidate region is the number of valley regions included in the eye candidate region. The height Hd of an eye candidate region is given by:

$$Hd = Sd/Wd \quad (3)$$

Where,

Hd is the height of an eye candidate region;

Sd is the size of an eye candidate region;

Wd is the width of an eye candidate region.

With reference to step S165 in FIG. 16A, the ratio of the width to the height of an eye candidate region is calculated. If in step S165 the ratio of the width to the height of an eye candidate region is not bigger than a fourth threshold (for example, 3.33), the flow goes to step S1610. In the present embodiment, the fourth threshold is within the range of 1 to 5. In step S1610, the eye candidate region is determined as a false eye area and is rejected. Then the flow goes to step S168.

At step S165, if the ratio of the width to the height of an eye candidate region is bigger than the fourth threshold, the flow advances to step S166.

Figure 16B:
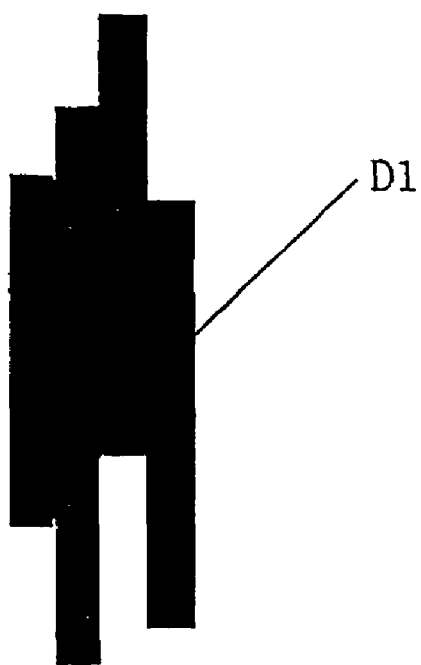
FIG. 16B is a diagram showing a candidate eye area and its circum-rectangle.
Figure 16B:
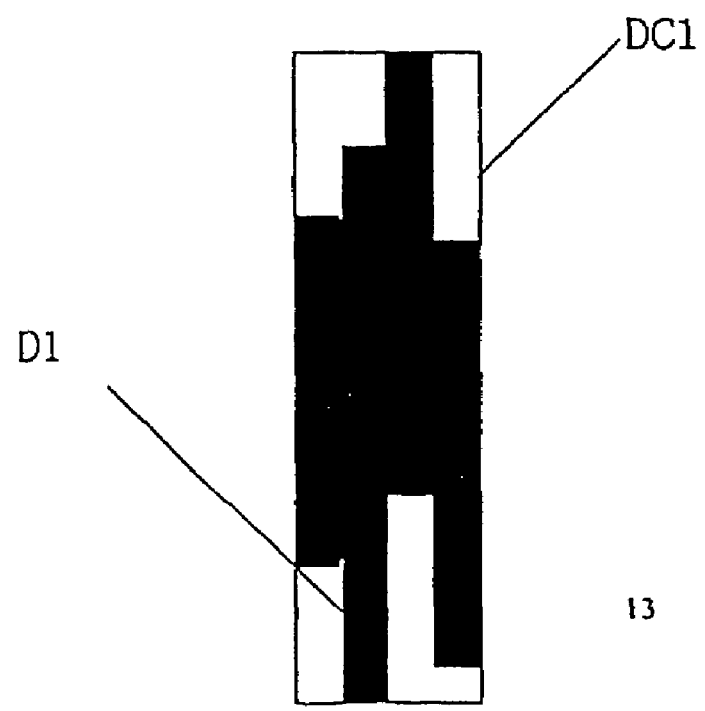

The ratio of the size of an eye candidate region to that of its circum-rectangle is calculated in step S166. FIG. 16B is a diagram showing an eye candidate region and its circum-rectangle. With reference to FIG. 16B, an eye candidate region D1 and its circum-rectangle DC1 are given. As seen from FIG. 16B, the eye candidate region's circum-rectangle DC1 is the smallest rectangle that encircles the eye candidate region D1. The size of an eye candidate region's circum-rectangle is the number of pixels included in the circum-rectangle. The size of an eye candidate region is the number of pixels included in the eye candidate region.

At step S166, the ratio of the size of an eye candidate region to that of its circum-rectangle is calculated. If the ratio is not bigger than a fifth threshold (for example 0.4) in step S166, the flow goes to step S1610. In the present embodiment, the fifth threshold is within the range of 0.2 to 1. In step S1610, the eye candidate region is determined as a false eye area and is rejected. Then the flow goes to step S168.

At step S166, if the ratio of the size of an eye candidate region to that of its circum-rectangle is bigger than the fifth threshold, the flow advances to step S167, where the eye candidate region is determined as a true eye area.

After step S167, the flow advances to step S168 and determines whether the eye candidate region is the last eye candidate region. If NO, then the next eye candidate region is read in step S169 and the flow returns to step S162. If YES in step S168, then all eye areas are determined. FIG. 16C is an example showing the result for detecting eye areas in an image in step S133.

Adjusting Segment's Border

Figure 17A:
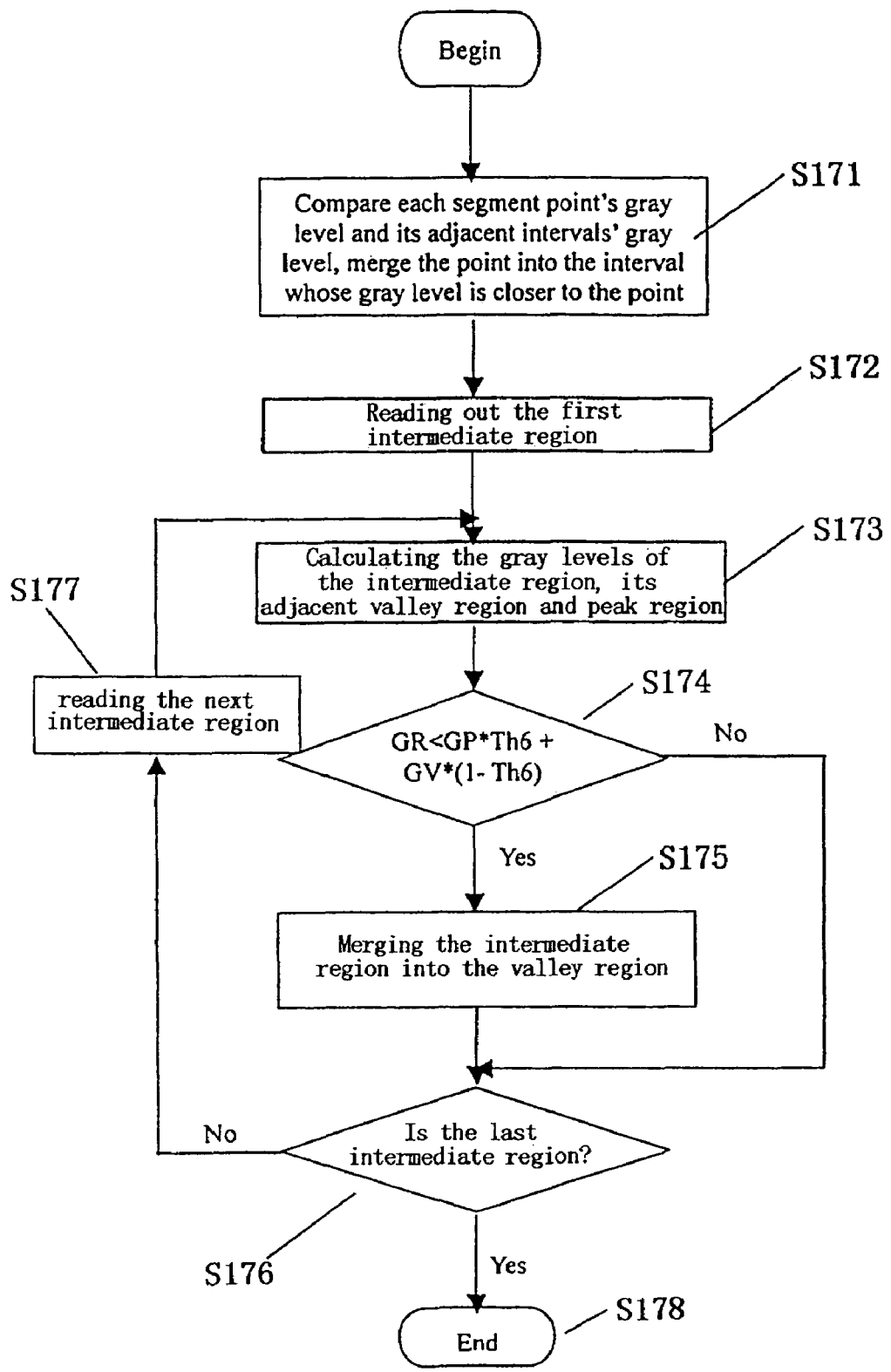
FIG. 17A is a flow chart showing the process for adjusting segment border.

FIG. 17A is a flow chart showing the process of adjusting segment border in step S145 in FIG. 14A.

Figure 17B:
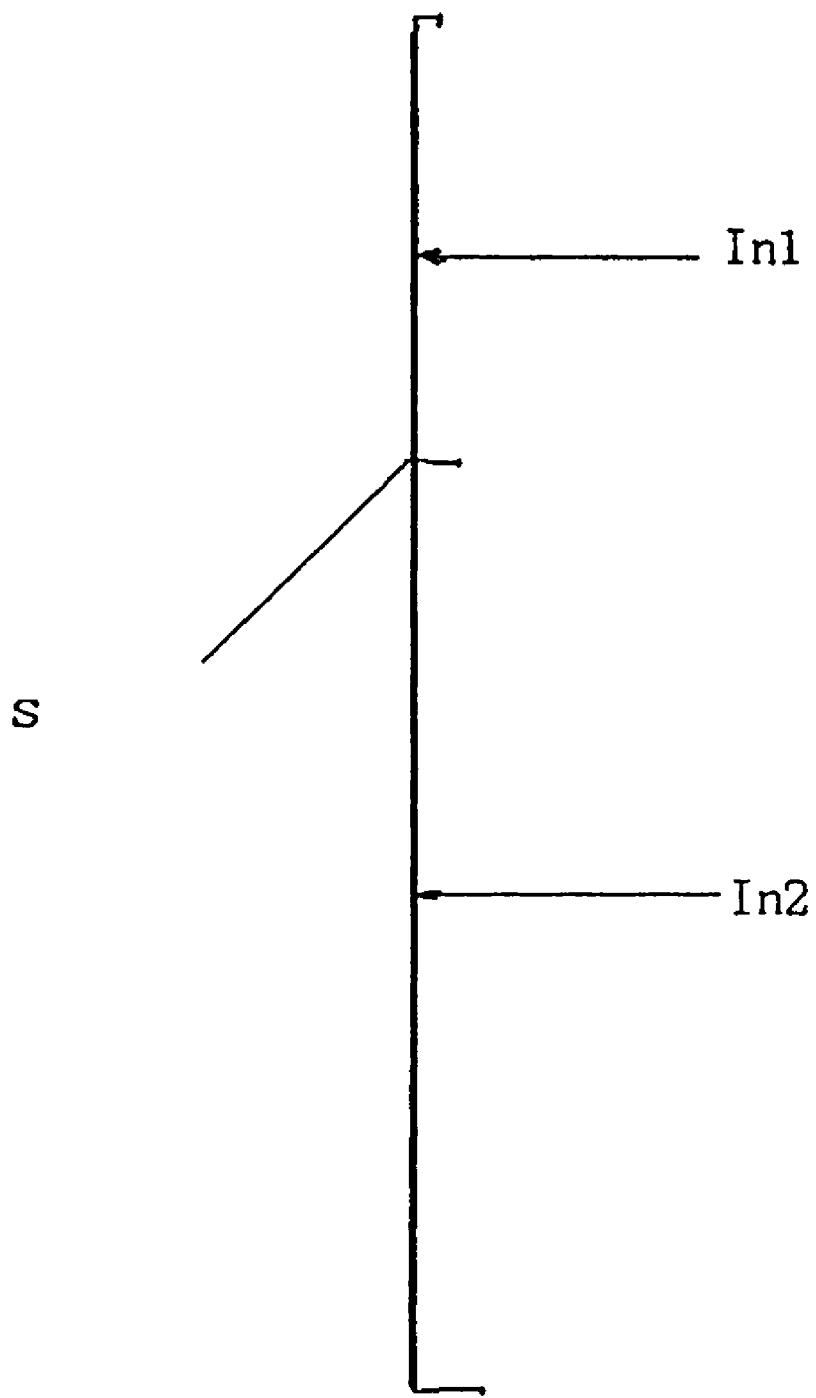
FIG. 17B is a diagram showing the merger of a segment point to its adjacent intervals.

With reference to FIG. 17A, the tray level of a segment point is compared with the gray levels of its two adjacent intervals, then the point is merged into the interval whose gray level is closer to the point's gray level in step S171. For example, referring to FIG. 17B, the gray level of segment point S is 80, its adjacent intervals are intervals In1 and In2. The gray levels of intervals In1 and In2 are 70 and 100 respectively. Since the gray level of interval In1 is closer to that of point S, then S is merged into interval In1.

Further, the flow advances to step S172. In step S172, the first intermediate region is read out. Then the gray levels of the intermediate region and its adjacent valley region and peak region are calculated in step S173. After the gray levels of them have been calculated, the flow advances to step S174. In step S174, a comparison is made to decide whether GR is less than GP×Th6+GV×(1−Th6), wherein, GR denotes the gray level of the intermediate region, GV denotes the gray level of the intermediate region's adjacent valley region, GP denotes the gray level of the intermediate region's adjacent peak region. Th6 is the sixth threshold (for example, 0.2). In the present embodiment, the sixth threshold is within the range of 0 to 0.5. If the decision of step S174 is NO, the flow goes to step S176. If the decision of step S174 is YES, then the intermediate region is merged into the valley region in step S175.

Figure 17C:
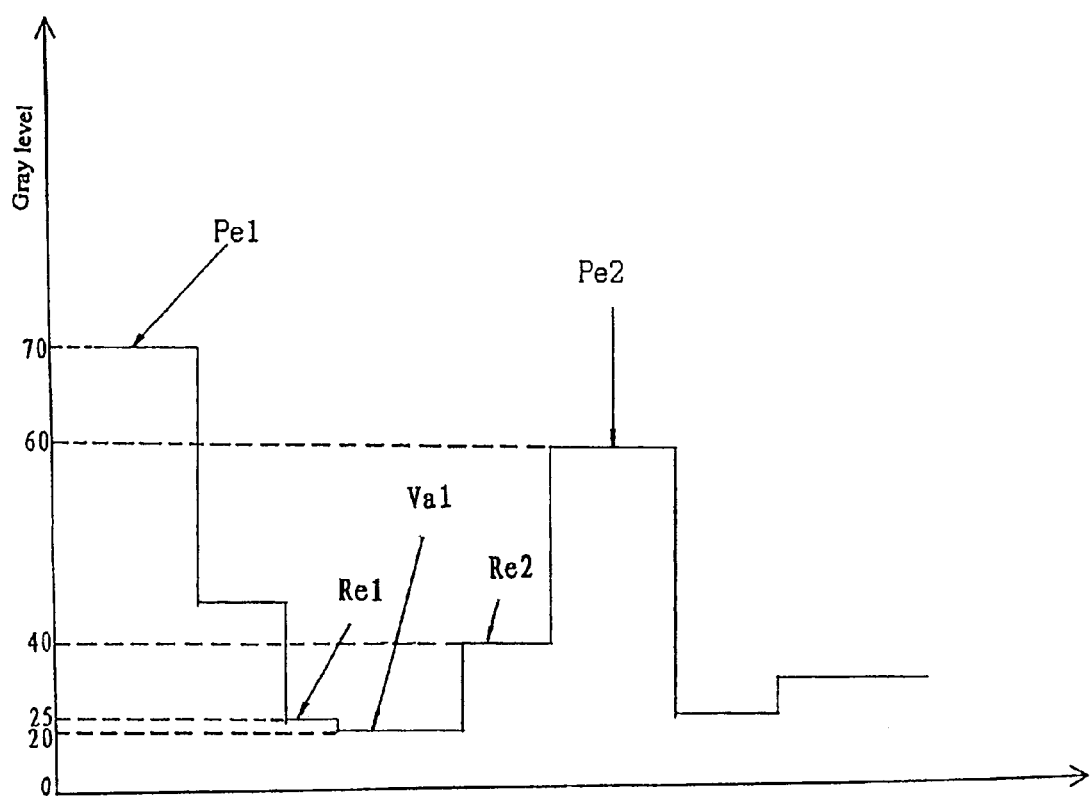
FIG. 17C is a diagram showing the merger of an intermediate region to its adjacent valley region.

FIG. 17C is a diagram showing an example for merging the intermediate region to the adjacent valley region. X axis shown in FIG. 17C represents the position of each column, Y axis shown in FIG. 17C represents the gray level of each region.

Referring to FIG. 17C, intermediate region Re1's gray level is 25, valley region Va1's gray level is 20, and peak region Pe1's gray level is 70. When the sixth threshold is set as 0.2, then $GP \times Th6 + GV \times (1-Th6) = 70 \times 0.2 + 20 \times 0.8 = 30 > GR = 25$ Therefore, the decision in step S174 is YES, so the intermediate region Re1 will be merged into the valley region Va1. Further, intermediate region Re2's gray level is 40, peak region Pe2's gray level is 60, then $GP \times Th6 + GV \times (1-Th6) = 60 \times 0.2 + 20 \times 0.8 = 28 < GR = 40;$ Therefore, the decision in step S174 is NO, so intermediate region Re2 will not be merged into the valley region Va1.

Referring to step S176 in FIG. 17A, it is checked if all the intermediate regions in the detected image have been processed. If the intermediate region is not the last intermediate region, the next intermediate region will be read in step S177, then the flow returns to step S173 to repeat the processes in step S173 and the subsequent steps. However, if it is checked in step S176 that the intermediate region is the last intermediate region, i.e. the processing for all intermediate regions is complete, the flow ends in step S178. Thus, all segment borders in the detected image have been adjusted.

Determining Whether a Valley Region can be Merged Into a Seed Region

Figure 18A:
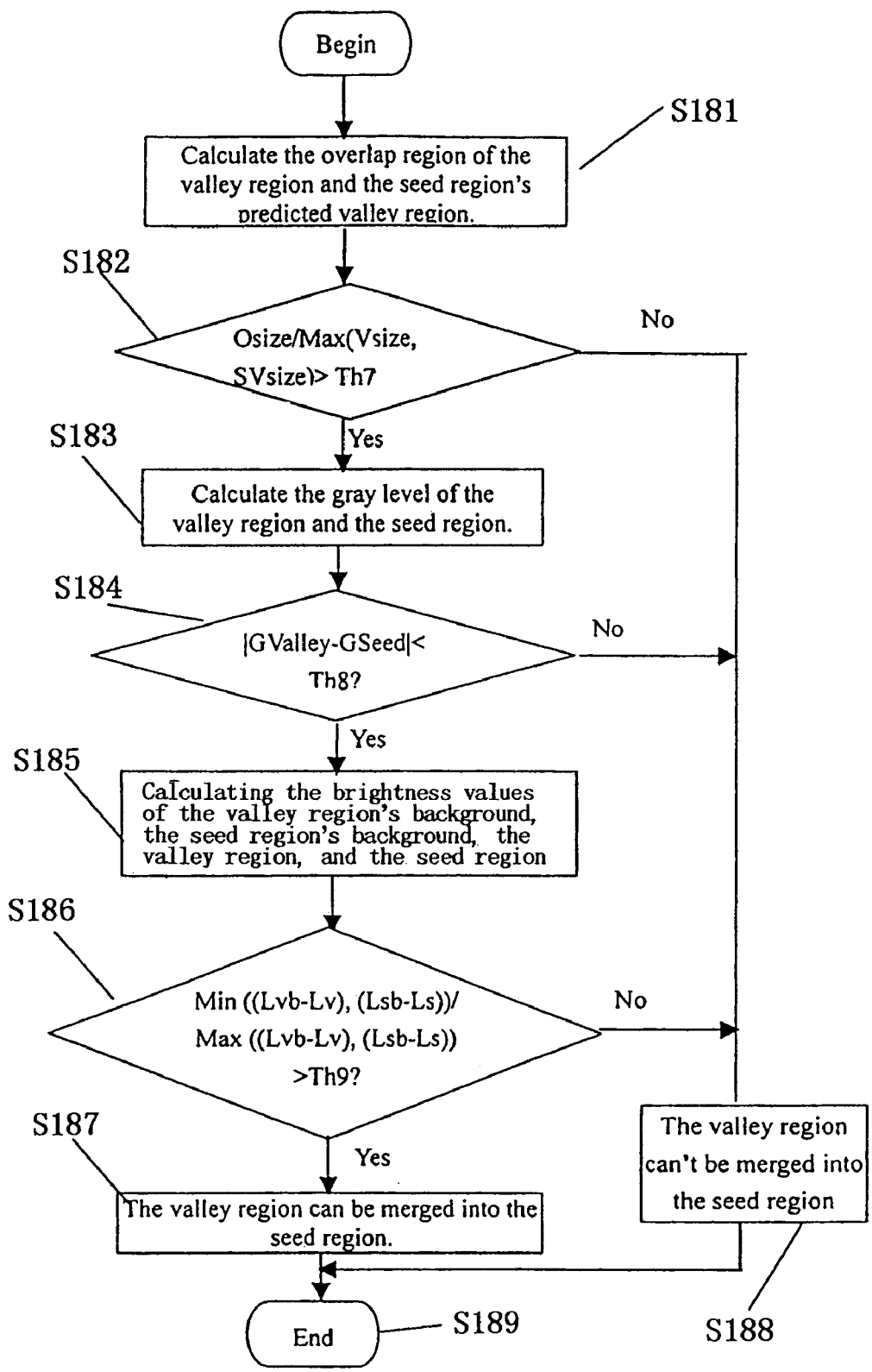
FIG. 18A is a flow chart showing a process for judging whether a valley region can be merged into a seed region.

FIG. 18A is the flow chart for showing the process for determining whether a valley region can be merged into a seed region in step S154 in FIG. 15A.

Figure 18B:
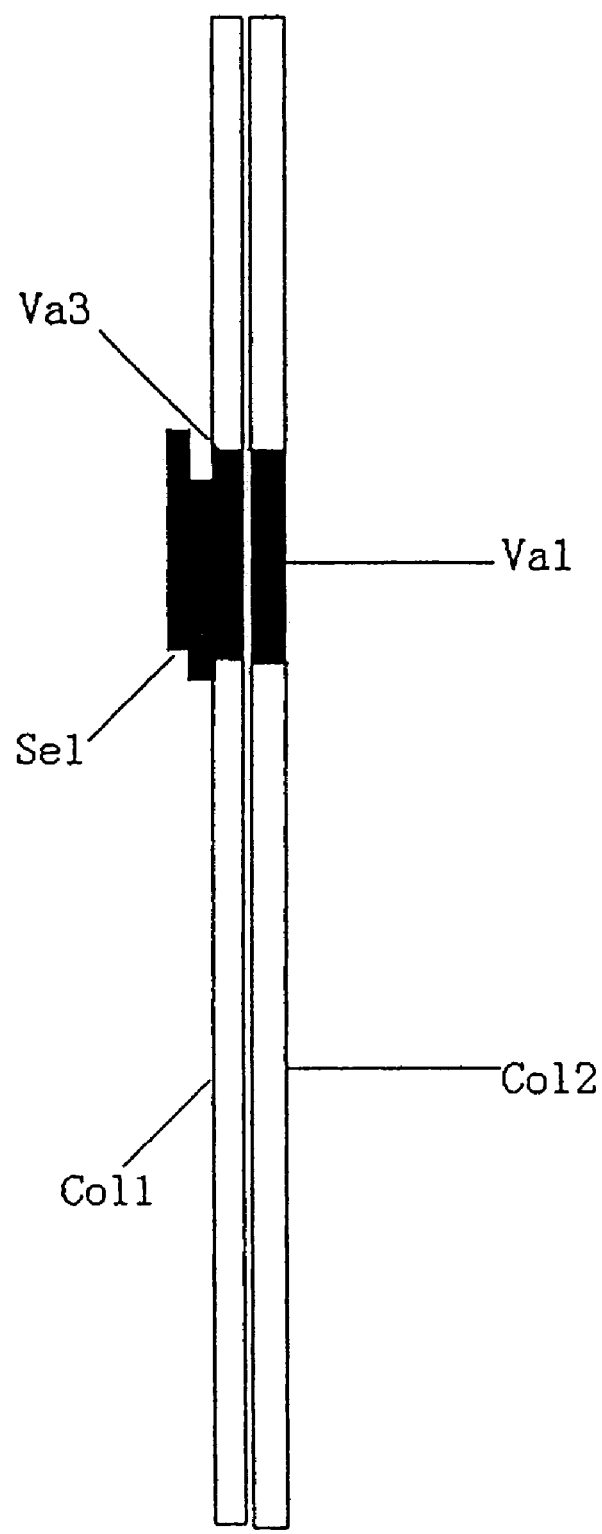
FIG. 18B is a diagram showing a seed region's predicted valley region.

FIG. 18B is a diagram showing a seed region's predicted valley region. A seed region's predicted valley region isn't a real existing valley region in any columns of the detected image. It is a valley region that is assumed in the next column of the column including the most adjacent valley region at the right of the seed region, and its position is the same as that of the most adjacent valley region at the right of the seed region. With reference to FIG. 18B, valley region Va3 is the most adjacent valley region at the right of seed region Se1. Valley region Va3 is in the column Col1, and column Col2 is the next column of column Col1. Then valley region Va1 is the predicted valley region of seed region Se1. This predicted valley region is in column Col2, and its position is the same as that of valley region Va3 but in a different column.

Figure 18C:
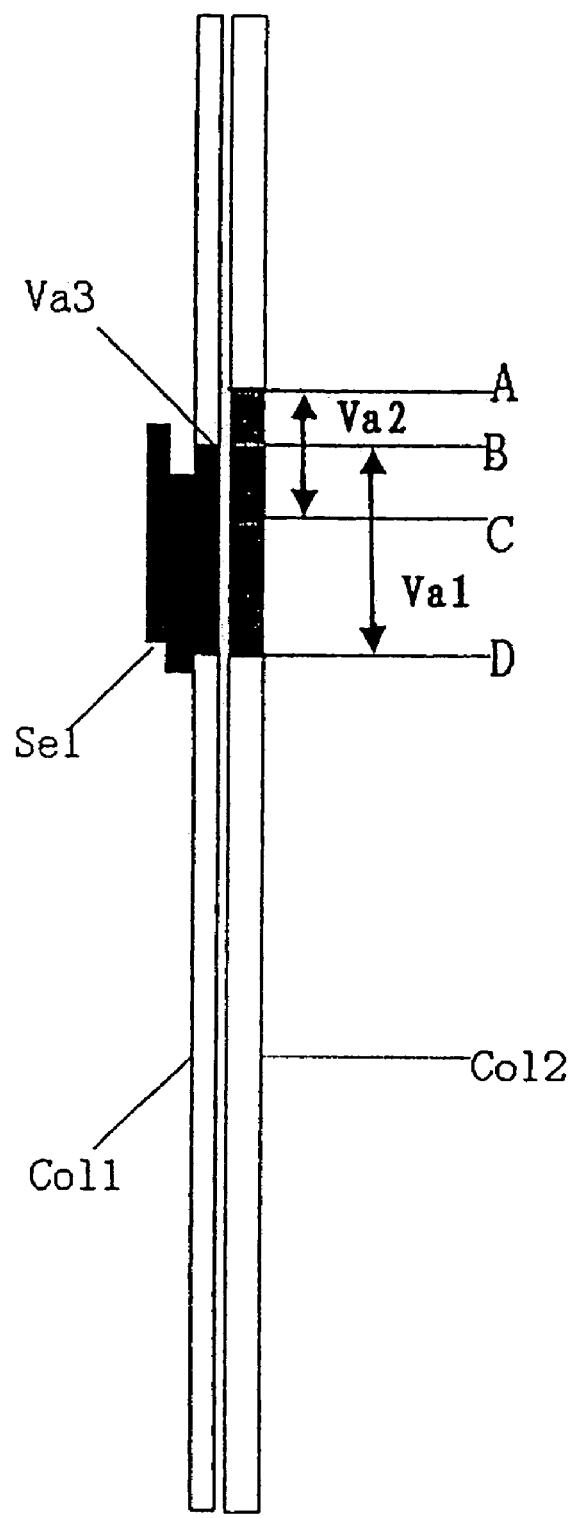
FIG. 18C is a diagram showing an overlap between two valley regions.

FIG. 18C is a diagram showing an overlap region of two valley regions. The overlap region of two valley regions is an area in which the pixels belong to the two valley regions.

Referring to FIG. 18C, the interval from point B to point D is a valley region Va1, the interval from point A to point C is a valley region Va2, the valley region Va1 is the predicted valley region of the seed region Se1, the valley region Va2 is a real valley region in column Col2. Then, the interval from point B to point C is the overlap region of the valley region Va1 and the valley region Va2.

The procedure for judging whether a valley region can be merged into a seed region will be explained below with reference to the flow chart in FIG. 18A. Referring to FIG. 18A, the overlap region of a valley region and a seed region's predicted valley region is calculated in step S181.

After the overlap region has been calculated, the flow advances to step S182. In step S182, a comparison is made to decide whether Osize/Max(Vsize, SVsize) is bigger than Th7, wherein, Osize is the size of overlap of the valley region and the seed region's predicted valley region, Max (Vsize, SVsize) is the maximum of the size of the valley region and that of the seed region's predicted valley region, and Th7 is the seventh threshold (for example, 0.37). The seventh threshold is within the range of 0.2 to 0.75.

If the decision of step S182 is NO, the flow goes to step S188; then the valley region can not be merged into the seed region, and the flow ends in step S189. Otherwise, if the decision of step S182 is YES, then the flow advances to step S183.

In step S183, the gray levels of the valley region and the seed region are calculated. Then the flow advances to step S184. In step S184, it is determined whether |GValley-GSeed| is less than Th8, wherein GValley is the gray level of the valley region, GSeed is the gray level of the seed region, and Th8 is an eighth threshold(for example, 40). The eighth threshold is within the range of 0 to 60. If the decision of step S184 is NO, the flow goes to step S188; then the valley region can not be merged into the seed region, and the flow ends in step S189. Otherwise, if the decision of step S184 is YES, then the flow advances to step S185.

In step S185, the luminance values of the valley region's background, the seed region's background, the valley region and the seed region are calculated.

As to the luminance value of a pixel in an image, it can be calculated by:

$$G=0.12219 \times L^2 - 0.0009063 \times 2 + 0.000036833526 \times L^3 - 0.0000001267023 \times L^4 + 0.0000000001987583 \times L^5; \quad (4)$$

where G is gray level of a pixel ranged from 0 to 255; and L is luminance level of a pixel and is also ranged from 0 to 255.

Therefore, the luminance value of a pixel can be obtained from its gray level in an image. On the other hand, the gray level of a pixel can be obtained from its luminance value.

For the present example, the pixels Pi1 and Pi2 in FIG. 14 F have the gray levels of 50 and 150 respectively. With formula (4), it can be determined that the luminance valves of pixels Pi1 and Pi2 are 128 and 206 respectively.

Referring to FIG. 18A, after step S185, the flow advances to step S186. In step S186, it is determined whether Min ((Lvb-Lv), (Lsb-Ls))/Max((Lvb-Lv), (Lsb-Ls)) is bigger than Th9, wherein Lv is the luminance value of the valley region, Ls is the luminance value of the seed region, Lvb is the luminance value of the valley region's background, Lsb is the luminance value of the seed region's background. Min ((Lvb-Lv), (Lsb-Ls)) is the minimum of (Lvb-Lv) and (Lsb-Ls), Max ((Lvb-Lv), (Lsb-Ls)) is the maximum of (Lvb-Lv) and (Lsb-Ls), and Th9 is a ninth threshold (for example, 0.58). The ninth threshold is within the range of 0.3 to 1. If the decision of step S186 is NO, the flow goes to step S188; then the valley region can not be merged into the seed region, and the flow ends in step S189. Otherwise, if the decision of step S186 is YES, the flow advances to step S187.

In step S187, the valley region is merged into the seed region, then the flow ends in step S189.

As can be seen from the above, the present invention provides a method and a device for quickly detecting areas, each of which corresponds to a human eye, mi an image, with a complex background, without requiring that detected image has a very high quality, thus greatly reducing the possibility that human eyes in the image fails to be detected. The method of the invention allows for the precision detection of human eyes under different scales, orientation and lighting condition. Therefore, with the method and device of the present invention, the human eyes in an image can be quickly and effectively detected.

The method and device of the present invention explained above are described with reference to detection human eyes in an image, however, the method and device of the present invention are not limited to detection human eyes, it is applicable to other detection method, for example, method to detect: flaw portion on a circuit board.

In addition, the above method and device for detecting areas corresponding to human eyes in an image are used for detection of human face contained in an image, but the method and apparatus for the detection of human face in an image of the present invention may also use other methods and devices for detection of human eyes in the image on which detection is to be performed, for example, the method disclosed in Kin-Man Lam, "A Fast Approach for Detecting Human faces in a Complex Background", Proceedings of the 1998 IEEE International Symposium on Circuits and System, 1998, ISCAS'98 Vol. 4, pp 85–88 can be used in the method and apparatus of the present invention for human face detection.

Upon detecting at least two eye (or dark) areas, an arbitrary pair of the eye areas is selected as a pair of candidate eyes. For each pair of selected eye areas, the distance L between the centers of them is determined. Then, a rectangular sub-image 300A is determined as show in FIG. 11. For human face detection, in addition to the rectangular sub-image as shown in FIG. 11, another rectangular sub-image is also determined for detection of human face, which is symmetrical to the rectangular sub-image of FIG. 11 with respect to the lines passing the centers of the pair of eye areas.

Figure 11:
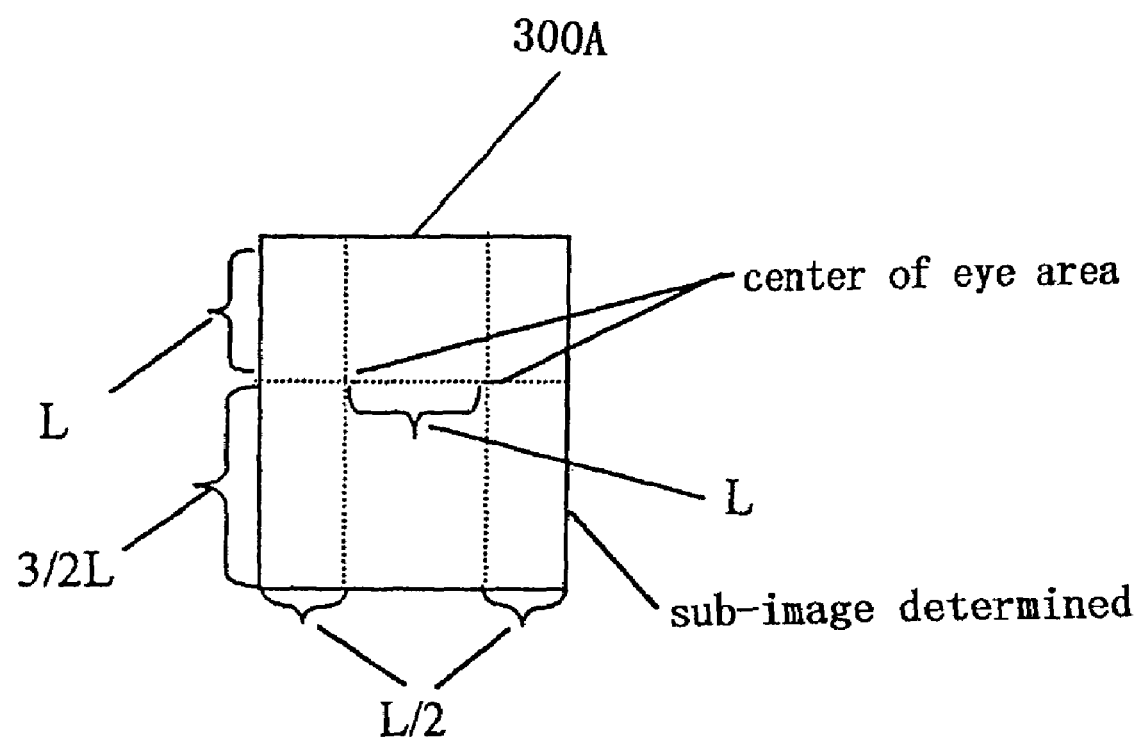
FIG. 11 is for showing a way for generating a sub-image for human face detection from a pair of dark (eye) areas detected, which are expected to correspond a pair of human eyes.

It is to be noted that the values/ratios shown in FIG. 11 are not necessarily strict, rather, values/ratios varying within certain range (such as ±20 or so) from those as shown in FIG. 11 are acceptable for performing the method for human face detection of the present invention.

In the case that more than two eye areas are detected, each possible pair of eye areas are chosen for determination of respective sub-images. And for each pair of eye areas in the image, two rectangular sub-images may be determined in the manner as described above.

Then, for each sub-image thus determined, detection is performed as to whether the sub-image corresponds to a picture of human face, as described below.

Moreover, the shape of the sub-image 300A for detection is not limited to rectangular, rather, it can be any suitable shape, e.g. ellipse etc.

Also, the location of the human face portion (sub-image) of the image can be determined not only by detecting eye areas (dark areas) in the image but also by detecting other features of human face such as mouth, nose, eyebrows, etc. in the image. Moreover, for determining the location of human face in an image by detecting human face features such as eyes, mouth, nose, eyebrows, etc, in the image, in addition to the method of human eye detection of the present invention as disclosed above, any suitable prior art methods for determining human face features (eyes, eyebrows, nose, mouth, etc.) can be used for locating the sub-image for human face detection, including the methods as disclosed in the prior art references listed in the Background of the Invention of the present specification.

Determination of Annular Region

Then, the flow goes to step S42. In step S42, an annular region 300R (FIG. 5) surrounding the sub-image (rectangular region) 300A is determined by an annular region determination means 211. The generation of the annular region 3008 will be described in detail with reference to FIG. 5.

Figure 5:
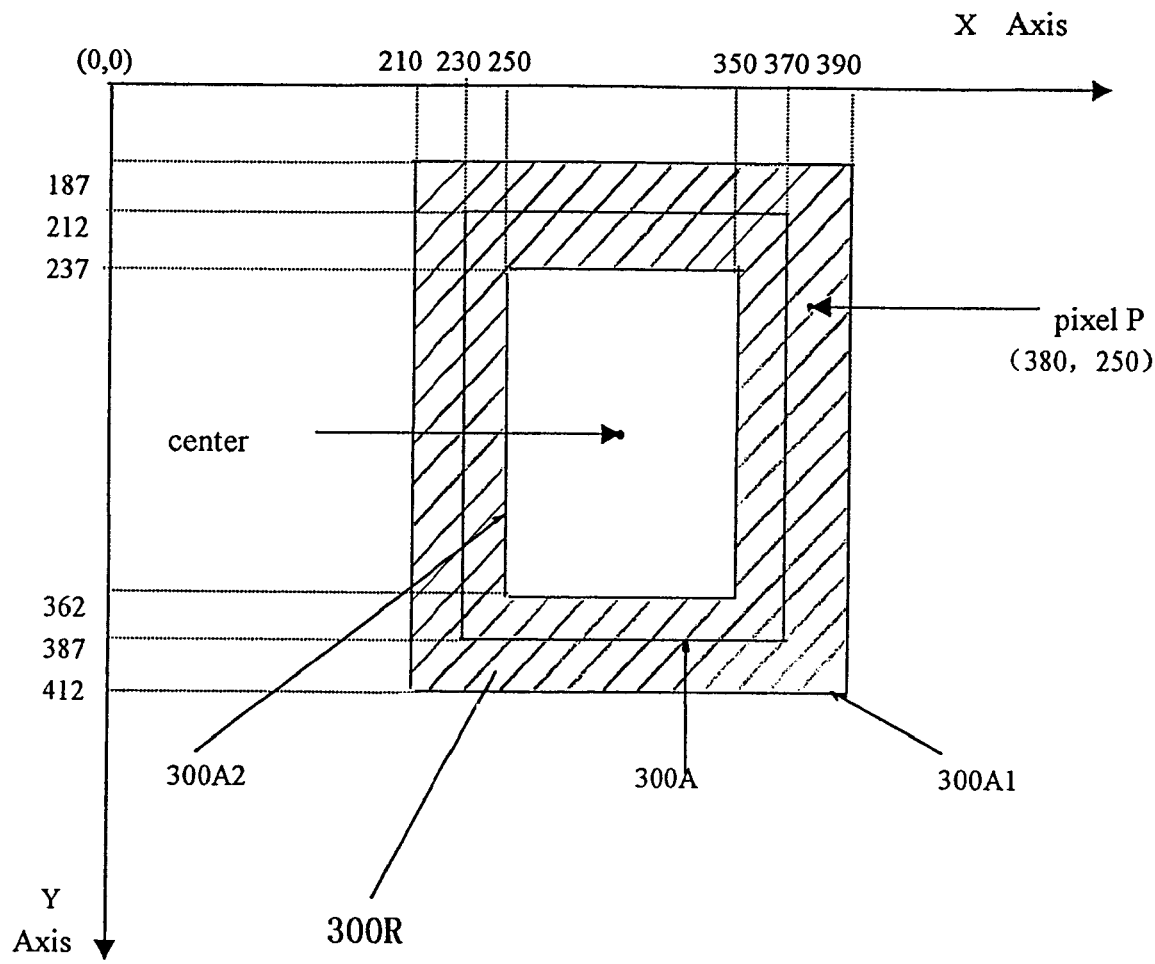
FIG. 5 is a diagram showing a sub-image, (rectangular region) determined for detection in the image of FIG. 3 and the determined annular region around it.

FIG. 5 is a diagram showing the rectangular region 300A of FIG. 3 and the determined annular region 300R around it. In the Cartesian coordinate system shown in FIG. 5, the upper left corner of the original image 300, is taken as the coordinate origin, wherein X and Y axes extend in horizontal or vertical directions respectively.

Referring to FIG. 5, by making use of reading means 210 as shown in FIG. 2, the pre-stored original image 300, as shown in FIG. 3, is read from the HD 107 or the RAM 109, and the location or rectangular region 300A relative to the original image 300 is also acquired. In the present embodiment, the coordinates of each of the four corners of rectangular region 300 are (230, 212), (370, 212), (230, 387) and (370, 387) respectively in the given Cartesian coordinate system, thus its width and length is 140 and 175 respectively.

From rectangle 300A, two rectangles 300A1 and 300A2 are derived, Rectangle 300A1 is linearly enlarged with respect to rectangle 300A with a factor of 9/7, and rectangle 300A2 is reduced with respect to rectangle 300A with a factor of 5/7. Two rectangular regions 300A1 and 300A2 are produced. Thus the coordinate of each of the four corners of the first rectangular region 300A1 in this coordinate system is (210, 187), (390, 187),(210, 412) and (390, 412) respectively; while the coordinate of each of the four corners of the second rectangular region 300A2 in this coordinate system is (250, 237), (350, 237), (250, 362) and (370, 362) respectively. The region between the first rectangular region 300A1 and the second 300A2 forms the annular region 3008 for the above-mentioned rectangular region 300A.

The annular region 300R shown in FIG. 5 is produced by first enlarging the width and length of the rectangular region 300A with a factor of 9/7 and then reducing that with a factor of 5/7. But the present invention is not limited to it, as the width and length of the larger rectangular region can be at a factor of n and those of the smaller rectangle at a factor of m, thus the larger rectangular region and the smaller 300A2 rectangular region are respectively produced, where m within the range of 0 to 1 and n within the range of 1 to 2.

Calculating the Gradient of the Gray Level at Each Pixel in the Annular Region and its Weight Returning to FIG. 4, the flow goes to step S43 after step S42. In step S43, the gradient of the gray level at each pixel in the annular region 300R is calculated by a first calculating means 212, while the weight of the gradient of gray level at each pixel in the annular region 300R is also determined.

Figure 6:
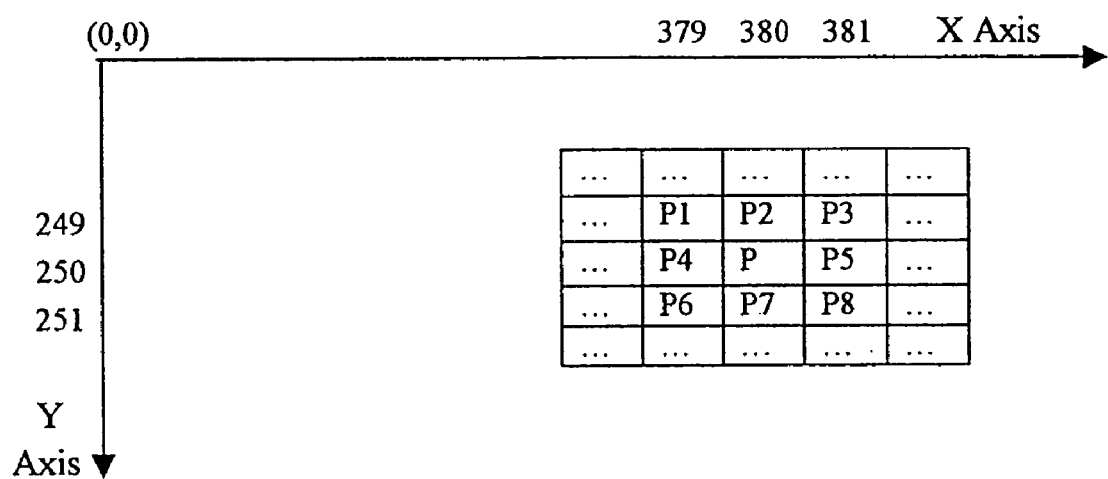
FIG. 6 is a diagram showing several pixels in an image.

With reference to FIG. 5 and FIG. 6, how the human face detection apparatus according to the present invention determines the gradient and its corresponding weight of the gray level at each pixel in the annular region 300R are explained.

In general, each pixel in an image is surrounded by many other pixels. Hence, the gradient of the gray level of a pixel can be determined by the gray levels of $k^2$ pixels around the certain pixel. Where, k is an integer ranged from 2 to 15. In the present embodiment, k is given to be 3. In the present invention, the Sobel, operator is used to calculate the gradient of the gray level distribution at each pixel in the annular region 300R in the original image.

Referring to FIG. 6, how to determine the gradient of the gray level of each pixel in the annular region 300R is explained, wherein the coordinates of pixel P in the coordinate system is (380, 250).

Referring to FIG. 6, the neighboring pixels of pixel P, pixels P1, P2, P3, P4, P5, P6, P7 and P8 are selected, so the surrounding pixels of pixel P are used. In the present embodiment, the gray level of each pixel in the image is from 0 to 255. Wherein the gray level of pixel P is 122, while the gray level of pixels P1, P2, P3, P4, P5, P6, P7 and P8 are 136, 124, 119, 130, 125, 132, 124, and 120 respectively.

According to Sobel operator, with the gray levels of the neighbor pixels P1, P2, . . . P8, etc., the gradient of gray level of pixel P is given by formula (5):

$$D \times 1 = (G3 + 2 \times G5 + G8) - (G1 + 2 \times G4 + G6)$$

$$DY1 = (G6 + 2 \times G7 + G8) - (G1 + 2 \times G2 + G3) \qquad (5)$$

Where DX1 is the x component of the gradient of the gray level distribution at pixel P, DY1 is the y component of the gradient of the gray level distribution at P; G1, G2, . . . G8 are the gray levels of pixels P1, P2, . . . P8 respectively.

Thus, on the basis of Formula (5), the gradient of gray level of pixel P can be determined as (−39, −3).

Similarly, the gradients of the gray levels of other pixels in the annular region 300R can be calculated. In the present embodiment, the gradients of pixels P1, P2, P3, P4, P5, P6, P7 and P8 are determined as (−30, −5), (−36, 4), (−32, 1), (−33, −6), (−30, −4), (−38, −8), (−33, −3) and (−31, 2) respectively. Thus, the gradient of gray level of each pixel in the annular region 300R can be determined in the same way.

Returning to FIG. 4, in step S43, the first calculating means 212 also determines the weight of the gradient of gray level of each pixel in the annular region 300R. For example, the gradient of gray level at a pixel can be given by formula (6):

$$W1 = (|DX1| + |DY1|)/255; \qquad (6)$$

Where W1 denotes the weight of a pixel, DX1 is the x component of the gradient of the gray level at the pixel, and DY1 is the y component of the gradient of the gray level at the pixel.

For example, referred to FIG. 6, in the present embodiment, the gradient of the gray level of pixel P is known as (−39, −3), hence the weight of the gradient of gray level of pixel P is (|−39|+|−3|)/255=0.165.

Likewise, the weights of the gradient of gray level of other pixels P1, P2, P3, P4, P5, P6, P7, P8, etc., in the annular region 300R can be easily determined as 0.137, 0.157, 0.129, 0.153, 0.133, 0.180, 0.141, 0.129, etc. respectively.

Calculating the Reference Gradient of Each Pixel in the Annular Region

Returning to FIG. 4, the flow goes to step S44 after step S43. In step S44, the second calculating means 213 calculates the gradient of a reference distribution at each point in the above-mentioned annular region 300R. The reference distribution represents an ideal model of human face in the region 300A. The gradient of the reference distribution is to be used by determination means 214 to determine how the portion of image in the annular region 300R is close to a human face image.

In the method and apparatus for human face detection of the present invention, human face detection is performed by evaluating the difference between the direction of the gradient of the gray level distribution in a relevant portion (annular region 300R) of the image to be processed and the direction of a reference gradient derived from the reference distribution.

Figure 7:
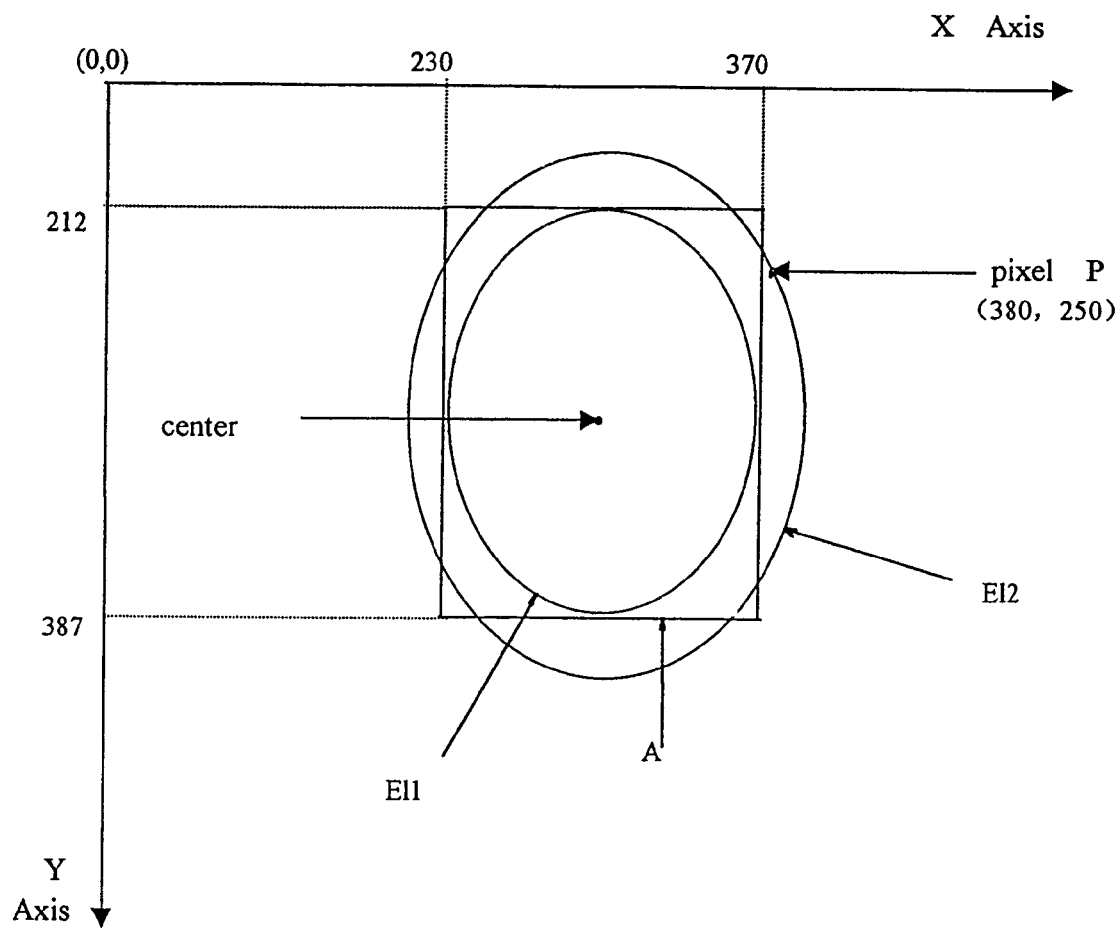
FIG. 7 is a diagram showing contour lines of a reference distribution for pixels in the annular region.
Figure 10:
FIG. 10 shows a reference distribution for use in detecting human face in an image; the reference distribution has contour lines as shown in FIG. 7.

Specifically, for each sub-image 300A determined, a reference distribution of a human face is determined, which can be expressed as:

$$z(x, y) = -\frac{(x - x_c)^2}{a^2} - \frac{(y - y_c)^2}{b^2} + h$$

wherein h is a constant, a/b equals to the ratio of the width of said sub-image to the height of said sub-image, $(x_c, y_c)$ is the center of the sub-image. FIG. 10 shows an image with such a reference distribution, and FIG. 7 shows the contour lines of (E11 and E12) of the reference distribution.

Then, the gradient of the reference distribution can be expressed as:

$$\nabla z = (\partial z/\partial x, \partial z/\partial y) = (-2(x - x_c)/a^2, -2(y - y_c)/b^2) \qquad (7)$$

As only the direction of the vector $(\partial z/\partial x, z/\partial y)$ is concerned here, and the reverse direction $(-\partial z/\partial x, -z/\partial d)$ will be treated as the same direction in the subsequent steps, proportional changes of the x component and the y component of $\nabla z$ would not change the result of the evaluation. So only the ration a/b is relevant. A typical value of the ratio a/b is 4/5.

So in step S44, the gradient $\nabla z$ is calculated using formula (7), and the gradient is called reference gradient.

After step S44, the flow goes to step S45. In step S45, for each pixel in the annular region 300R, and angle between the gradients $\nabla z$ and $\nabla g$ are calculated, where $\nabla g$=(DX1, DY1) is the gradient of the gray level distribution. Of course, Vg is not limited to being the gradient as calculated using formula (5), rather, it can be calculated using any other operator for discrete gradient calculation.

Specifically, the angle θ between $\nabla z$ and $\nabla g$ at point (x,y) can be calculated using:

$$\cos \theta = \nabla z \cdot \nabla g / (|\nabla g| \cdot |\nabla z|)$$

$$\theta = \cos^{-1}(\nabla z \cdot \nabla g / (|\nabla g| \cdot |\nabla z|)) \qquad (8)$$

where $\nabla z \cdot \nabla g$ denotes the inner product of vectors $\nabla z$ and $\nabla g$, and $|\nabla g|$ and $|\nabla z|$ denote the magnitudes of vectors $\nabla g$ and $\nabla z$ respectively. Note that θ is in the range of $0 \leq \theta \leq \pi/2$.

Thus, the angle between the two gradients of pixel P is determined as 0.46 (radian). Similarly, the angles between the two gradients at other pixels P1, P2, P3, P4, P5, P6, P7, P8, etc. in the annular region 300R can be easily determined as 0.19, 0.26, 0.33, 0.18, 0.23, 0.50, 0.27, 0.42 (radian), etc. respectively.

Further, in step S45, the average of the angles between the gradient of gray level and its corresponding reference gradient for all pixels in the annular region 300R is given by formula (9):

$$A1 = S1/C1 \qquad (9)$$

Where A1 denotes the average of the angles between the gradient of gray level and its corresponding reference gradient for all pixels in the annular region, S1 denotes the sum of the angles between the two gradients of all pixels in the annular region; C1 denotes the total number of pixels in the annular region.

As to the present example, the average angle between the gradient of gray level and its corresponding reference gradient of all pixels in the annular region 300R is determined as 0.59.

Returning to step S45 in FIG. 3, after the above-mentioned average of the gradient differences has been determined, it is determined in step S45 whether said average is less than a 11th threshold. In the present invention, the 11th threshold is between 0.01 and 1.5, such as 0.61. If the calculated average is determined to be less than the 11th threshold, then the flow goes to step S46. If not, the flow goes to step S48. In step S48, it is determined that the rectangle 300A does not contain an image of a human face, and then, the flow ends in step S49.

In the present example, the average of the angle between the gradient of gray level and its corresponding reference gradient for all the pixels in the annular region 300R is 0.59, which is less than the 11th threshold. Therefore, the flow goes to step S46.

In step S46, using the weight W1 as described above, a weighted average of the angle between the gradient of gray level and the reference gradient for all the pixels in the annular region 300R is determined, as is given by formula (10):

$$A2 = S2/C2; \qquad (10)$$

Where A2 denotes the weighted average of the angle between the two gradients for all the pixels in the annular region, C2 denotes the sum of the weights of pixels in the annular region, S2 denotes the sum of the product of the angle and the weight of gradient of gray level for the same pixels in the annular region.

In the present example, the weighted average angle between the two gradients for all pixels in the annular region is 0.66.

After the determination of the weighted average angle, it is determined in step S46 whether said weighted average angle is less than a 12th threshold, such as 0.68. The 12th threshold in the present invention is ranged from 0.01 to 1. If the weight average angle is determined to be less than the 12th threshold, then the flow goes to step S47, where it is determined that the rectangle 300A contains an image of a human face, then the flow ends in step S49. If the weighted average angle is not less than the 12th threshold, then the flow goes to step S48. In step S48, it is determined that the rectangle 300A does not contain an image of a human face, and then, the flow ends in step S49.

As to the present example, the weighted average angle for all pixels in the annular region 300R is 0.66, which is less than the 12th threshold, and then the flow goes to step S47. In step S47, and the region 300A is determined to contain an image of a human face. Afterwards, the flow ends in step S49.

THE SECOND EXAMPLE

Figure 8A:
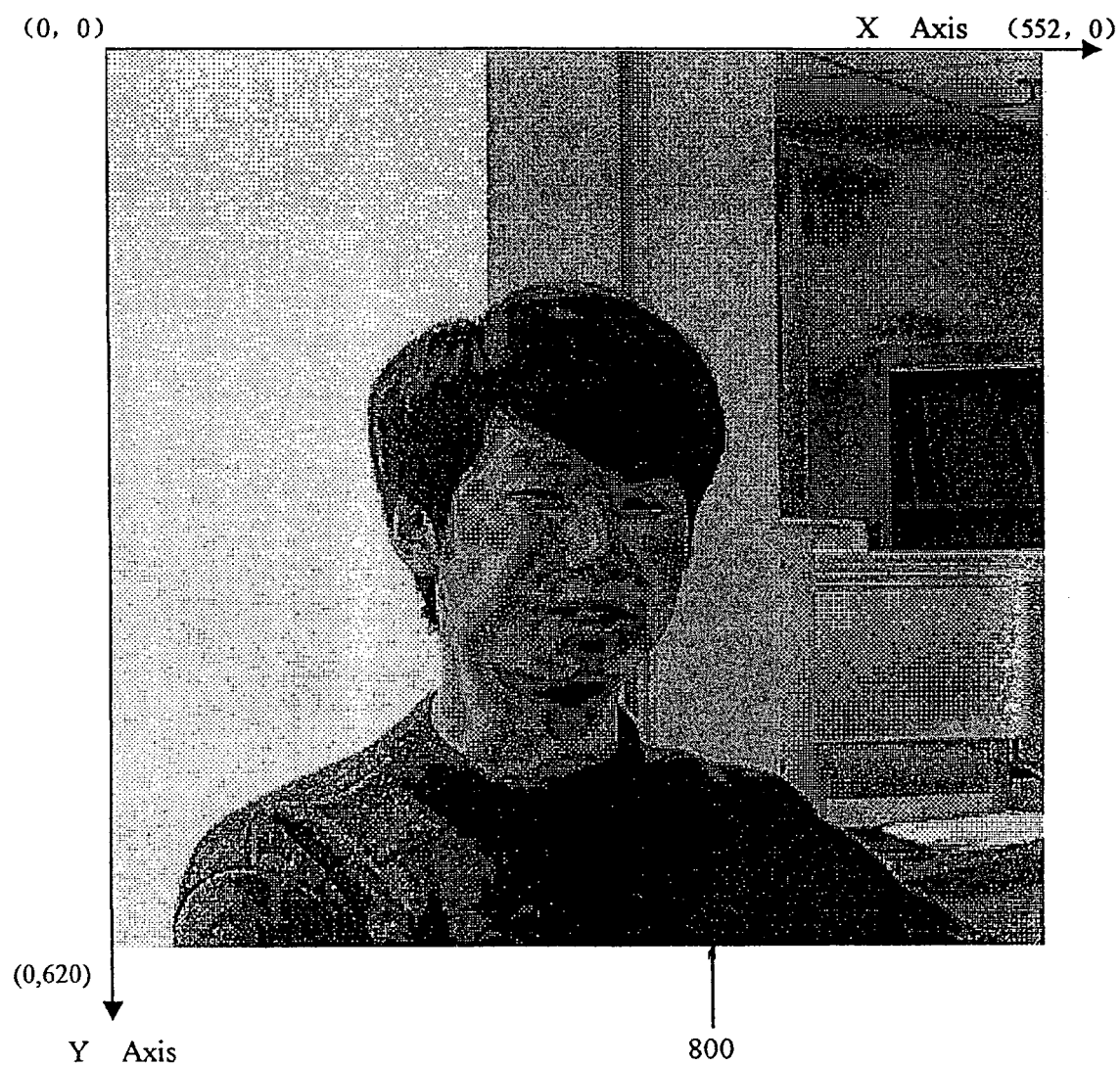
FIG. 8A is a diagram showing another example of an original image to be detected.

FIG. 8A is a diagram showing another example of an original image to be detected. The original image 800 in FIG. 8A is produced by a digital camera. Of course, it also can be input to human face detection system by a digital device 111, such as a scanner or the like. Assume that the original image is stored in a predetermined region in the HD 107 or the RAM 109, or the like.

Figure 8B:
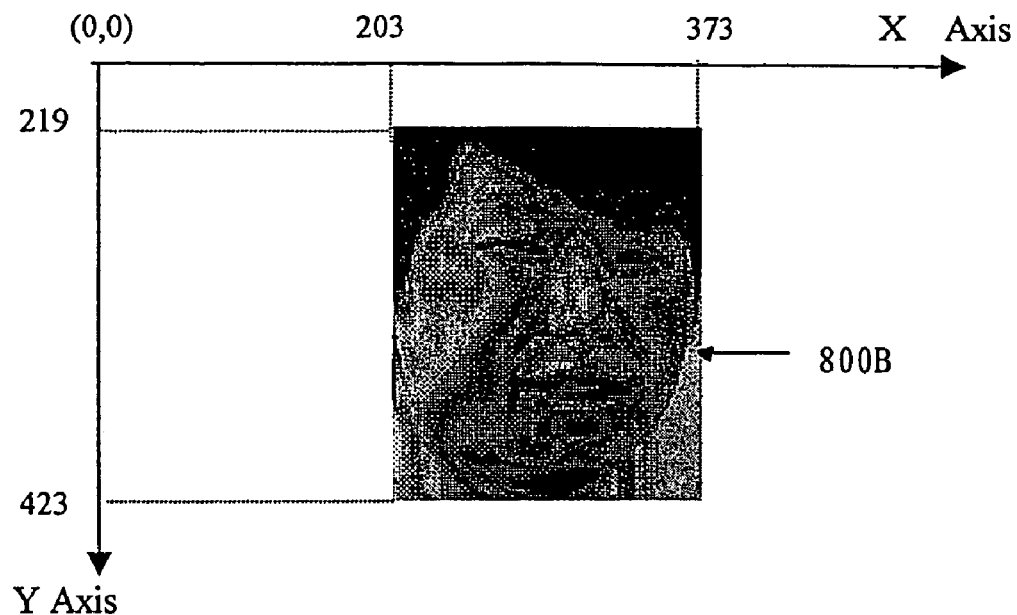
FIG. 8B is a diagram showing a sub-image (rectangular region) determined in the original image of FIG. 8A.

FIG. 8B is a diagram showing a rectangular region 800B in the original image 800, which is shown in FIG. 8A, and the location in Cartesian coordinate system, in which the X and Y axes extend in horizontal and vertical direction respectively.

As to the rectangular region 800B shown in FIG. 8B, the same flow chart shown in FIG. 4 is adopted to explain the process of determining whether the rectangular region 800B contains a human face.

Referring to FIG. 4, eye detecting device 218 determines eyes in the image, in step S41, reading means 210 reads the gray level of each pixel in the original image 800, and the sub-image determining device 219 determines rectangular regions to be detected, such as rectangular region 800B, in the original image 800. As shown in FIG. 8A, the origin of the Cartesian coordinate system is chosen to be at the upper left corner of the original image 800. Then the coordinates of each of the four corners of rectangular region 800B shown in FIG. 8B are (203, 219), (373, 219), (203, 423) and (373, 423) respectively in the Cartesian coordinate system. That is, the width and length of region 800B are 170 and 204 respectively.

Then, in step S42, the annular region 800C around the rectangular region 800B in FIG. 8B is determined by the annular region determination means 211. Referred to FIG. 8C, as to the rectangular region 800B, by scaling its width and length with a factor of 9/7 and a factor of 5/7 respectively, two rectangular regions 800C1 and 800C2 are generated.

Figure 8C:
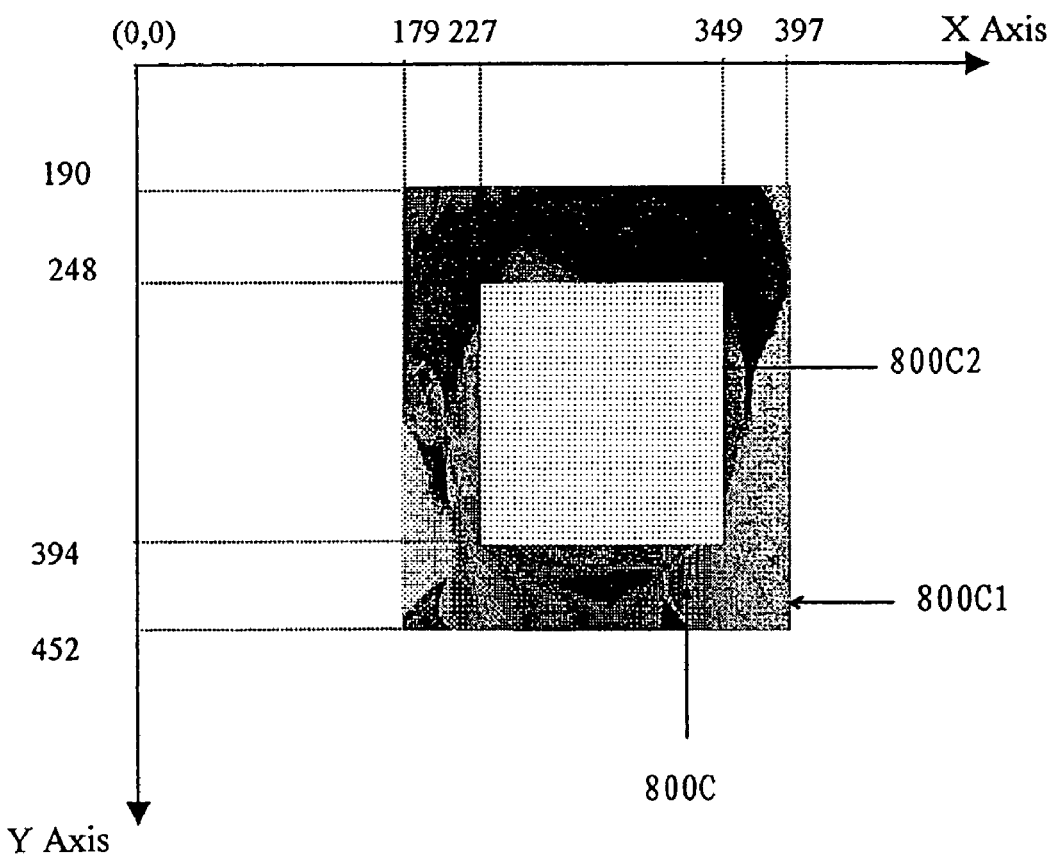
FIG. 8C is a diagram showing a annular region determined for the rectangular region in, FIG. 8B.

FIG. 8C is a diagram showing the annular region 800C, which is determined for the rectangular region 800B. The annular region 800C is formed by the first rectangular region 800C1 and the second rectangular region 800C2. The coordinates of each of the four corners of first rectangular region 800C1 in this coordinate system are (170, 190), (397, 190), (179, 452) and (397, 452) respectively, while the coordinates of each of the four corners of the second rectangular region 800C2 in this coordinate system are (227, 248), (349, 248), (227, 394) and (349, 394) respectively.

Then, in step S43, the gradient of the gray level of each pixel in the annular region 800C is determined by the first calculating means 212, which is (188, 6), (183, 8), (186, 10), (180, 6), (180, 6), etc. respectively. Similarly,the weight of the gradient of the gray level of each pixel in the annular region 800C is determined in the same way, which is 0.76, 0.75, 0.77, 0.77, 0.73, etc. respectively.

Further, in step S44, the reference gradient of each pixel in the annular region 800C is determined respectively by a second calculating means 213, which is (−0.015, −0.012), (−0.015, −0.012), (−0.015, −0.012), (−0.014, −0.012), etc. respectively. Then, the flow goes to step S45.

In step S45, the angle between the two gradients of each pixel in the annular region 800C is determined the average angle between the two gradients for pixels in the annular region 800C can be determined in the same way as above-mentioned, which is 0.56 for the present example and is less than the 11th threshold. Then the flow goes to step S46.

In step S46, the weighted average angle between the two gradients for pixels in the annular region 800C is determined as 0.64, which is less than the 12th threshold, and the flow goes to step S47, where it is determined that the rectangular region 800B contains an image of a human face. Then, the flow ends in step S49.

Alternative Embodiment

An alternative embodiment of the present invention is illustrated below.

Figure 9:
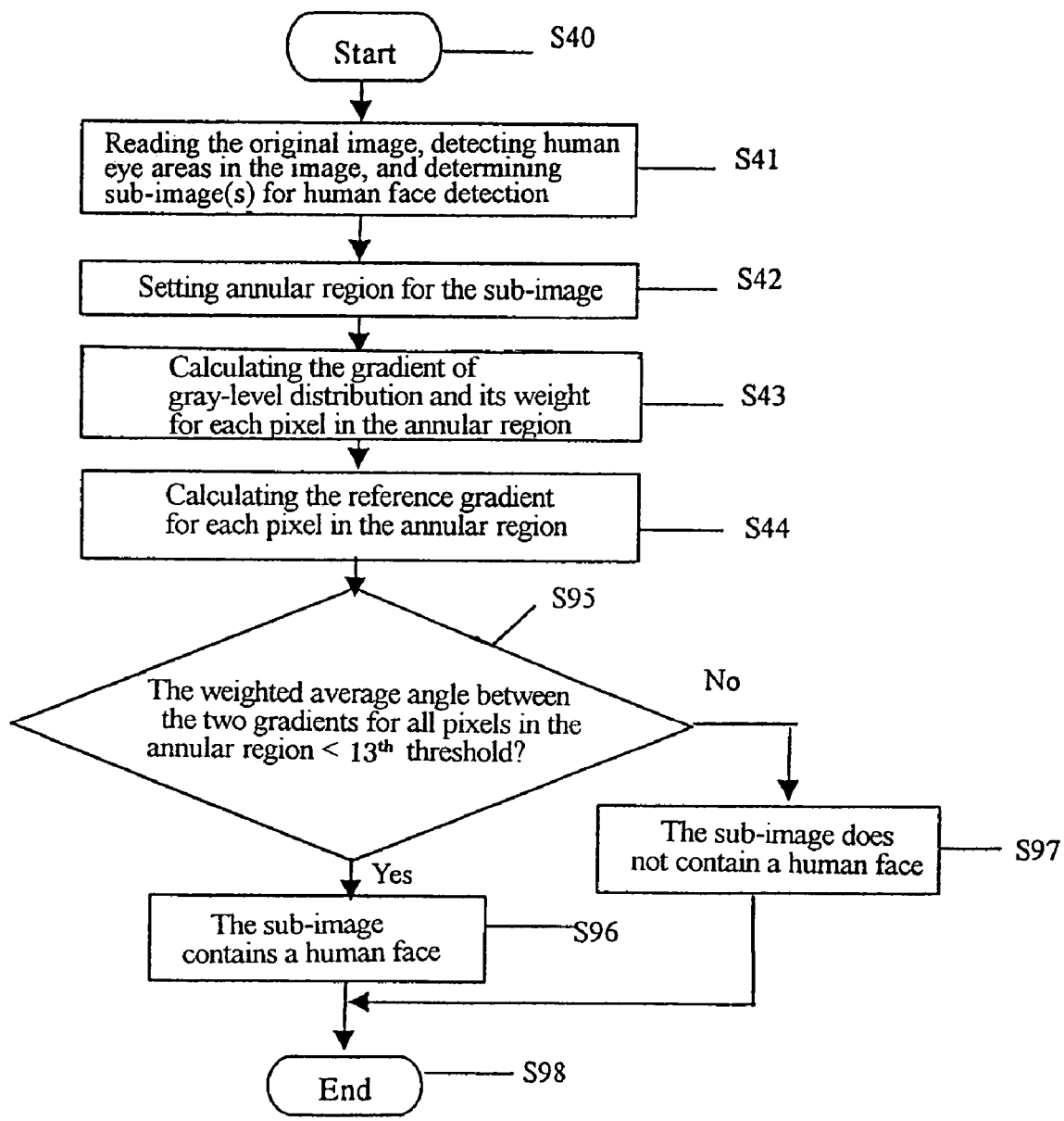
FIG. 9 is a flow chart showing the human face detection process of another embodiment according to the present invention.

FIG. 9 is a diagram showing the human face determination process according to the alternative embodiment of the present invention. In FIG. 9, the same reference numeral as that in FIG. 4 denotes the same process.

Again, the original image 800 in FIG. 8A is taken as an example to illustrate determining whether a rectangular region 800B in the original image 800 contains a human face image.

First, as in FIG. 4, the process flow starts in step S40. In step S41, reading means 210 reads the gray level of each pixel in original image 800; eye detecting means 218 detect eye areas in the image; and sub-image determining means 219 determines the sub-image(s), such as rectangular region 800B, to be detected based on the eye areas detected. Then the flow goes to step S42. In step S42, an annular region 800C is determined for rectangular region 800B, as shown in FIG. 8C. Further, the flow goes to step S43. In step S43, the gradient of the gray level at each pixel in the annular region 800C is determined, which is (188, 6), (183, 8), (186, 10), (180, 6), (180, 6), etc. respectively. The weight of the gradient of the gray level at each pixel in the annular region 800C is determined in the same way as in the previous embodiment, which is 0.76, 0.75, 0.77, 0.77, 0.73, etc. respectively. Afterwards, the flow goes to step S44. In step S44, the reference gradient of each pixel in the annular region 800C is determined, which is (−0.015, −0.012), (−0.015, −0.012), (−0.015, −0.012), (−0.015, −0.012), (−0.014, −0.012), etc. respectively.

Then, the flow goes to step S95. In step S95, the angle between the gradient of the gray level and its corresponding reference gradient at each pixel in the annular region 800C is calculated respectively e.g., in the same way as the previous embodiment. Which is 0.64, 0.63, 0.62, 0.64,.0.64, etc. (in radian), respectively. Then, the weighted average angle between the two gradients for all pixels in the annular region 800C is calculated. While in step S95, it is determined whether the weighted average is less than a 13th threshold, such as 0.68. In the present invention, the 13th threshold is ranged from 0.01 to 1. If the weighted average angle is less than the third threshold, then the flow goes to step S96. In step S96, the rectangular region is determined to contain a human face image. If the weighted average angle is not less than the 13th threshold, then the flow goes to step S97, where it is determined that region 800D does not contain a human face image. Then the flow ends in step S98.

For the preset example, since the average of the product of the gradient difference and its corresponding gradient weight of each pixel in the annular region is 0.64, which is less than the third threshold, the flow goes to step S96 to determine that the rectangular region to be determined 800B contains a human face. Afterwards, the flow ends in step S98.

As one skilled in the art may appreciate, it is not necessary that the angle between the gradients of the gray level distribution and a reference distribution is calculated and evaluated for every pixel in the annular region; rather, the method for detecting human face (or other object to be detected) according to the present invention can be carried out by calculating and evaluating the angle for only some of the pixels in the annular region.

Moreover, although in the above description, a specific embodiment, in which both the average of the angle between the gradients of the gray level distribution and a reference distribution and the weighted average of the angle are used for evaluation, and another specific embodiment, in which only the weighted average of the angle is used for evaluation, are described, an embodiment, in which only the non-weighted average of the angle is used for evaluation, also can realize the objects present invention and is also included as an embodiment of the present invention.

Note that the present invention may be applied to either a system constituted by a plurality of devices (e.g., a host computer, an interface device, a reader, a printer, and the like)i or an apparatus consisting of a single equipment (e.g., a copying machine, a facsimile apparatus, or the like).

The objects of the present invention are also achieved by supplying a storage medium. The storage medium records a program code of a software program that can implement the functions of the above embodiment to the system or apparatus, and reading out and executing the program code stored in the storage medium by a computer (or a CPU or MPU) of the system or apparatus. In this case, the program code itself read out from the storage medium implements the functions of the above-mentioned embodiment, and the storage medium, which stores the program code, constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be implemented not only by executing the readout program code by the computer but also by some or all of actual processing operations executed by an OS (operating system) running on the computer on the basis of an instruction of the program code.

As can be seen from the above, the method of the present invention provides a fast approach for determining human face in a picture with a complex background, without requiring the detected picture to have a very high quality, thereby substantially eliminating the possibility of the human face in the picture being skipped over. The method allows for the precision determination of human face under different scales, orientation and lighting condition. Therefore, in accordance with the present invention, with the method, apparatus or system, the human face in a picture can be quickly and effectively determined.

The present invention includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores programs codes corresponding to the flowcharts (FIG. 4, and 9) described in the embodiments.

The embodiment explained above is specialized to determine human face, however, the present invention is not limited to determine human face, it is applicable to other determination method, for example, method to detect flaw portion on a circuit board.

As many apparently widely different embodiments of the present invention can be made without departing from the spirit and scope thereof, it is to be understood that the invention is not limited to the specific embodiments thereof except as defined in the appended claims.

Although the embodiments of the invention described with reference to the drawings comprise computer apparatus and processes performed in computer apparatus, the invention also extends to computer programs on or in a carrier. The program may be in the form of source or object code or in any other form suitable for use in the implementation of the relevant processes. The carrier may be any entity or device capable of carrying the program.

For example, the carrier may comprise a storage medium, such as a ROM, for example a CD ROM or a semiconductor ROM, or a magnetic recording medium, for example a floppy disc or hard disc. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method for detecting an object in an image having a gray-level distribution, comprising the steps of:
    determining a sub-image by detecting a pair of dark areas in the image;
    selecting an area on the basis of the location of the sub-image;
    for a subset of pixels in the selected area, deriving a first variable from the gray-level distribution of the image,
    for that subset of pixels, deriving a second variable from a preset reference distribution, the reference distribution being characteristic of the object;
    evaluating the correspondence between the first variable and the second variable over the subset of pixels; and
    determining whether the image contains the object, based on the result of said evaluation step.

2. The method of claim 1, wherein the first variable presents the direction of the gradient of the gray-level distribution of the image.

3. The method of claim 2, wherein the second variable represents the direction of the gradient of the reference distribution.

4. The method of claim 3, wherein the gradient is a discrete gradient.

5. The method of claim 3, wherein said evaluation step includes a statistical process performed over the subset of pixels.

6. The method of claim 3, wherein said evaluation step includes a statistical processing over the subset of pixels and the statistical process comprises a weighting process, in which the weight assigned to each pixel in the subset is determined on the basis of the gradient of the gray level distribution at the pixel and pixels with larger magnitude of the gradient of the gray level distribution generally have larger weights.

7. The method of claim 6, wherein said evaluating step includes both the statistical process using the weighting process and another statistical process without the weighting process and determines whether the image contains the object in accordance with the results of both statistical processes.

8. The method of claim 3, wherein said evaluating step includes:
    for all the pixels in the subset, calculating the average value of the angle between the gradient of the gray-level distribution of the image and the gradient of the reference distribution;
    comparing the average value with a predetermined value; and
    determining that the sub-image contains the object if the average value is equal to or smaller than the predetermined value.

9. The method of claim 3, wherein said evaluating step includes:
    for all the pixels in the subset, calculating a weighted average value of the angle between the gradient of the gray-level distribution of the image and the gradient of the reference distribution, wherein a pixel having a greater magnitude of gradient of gray-level distribution generally has a larger weight;
    comparing the weighted average value with a predetermined value; and
    determining that the sub-image contains the object if the weighted average value is equal to or smaller than the predetermined value.

10. The method of claim 3, wherein said evaluating step includes:
    for all the pixels in the subset, calculating the average value of the angle between the gradient of the gray-level distribution of the image and the gradient of the reference distribution;
    for all the pixels in the subset, calculating a weighted average value of the angle between the gradient of the gray-level distribution of the image and gradient of the reference distribution, wherein a pixel having a greater magnitude of gradient of gray-level distribution has a larger weight;

comparing the average value with a first predetermined value;

comparing the weighted average value with a second predetermined value; and determining that the sub-image contains said object if the average value is equal to or is smaller than the first predetermined value and the weighted average value is equal to or smaller than the second predetermined value.

11. The method of claim 1, wherein the selected area is an annular area, which centers around the center of the sub-image.

12. The method of claim 1, wherein the subset of pixels includes all the pixels in the selected area.

13. The method of claim 1, wherein the sub-image is determined based on the positions of and interval between the centers of the pair of dark areas.

14. The method of claim 1, wherein the reference distribution is expressed by $$z(x,y)=-(x^2/a^2+y^2/b2)+h$$

where h is a constant, a/b equals the ratio of the width of the sub-image to the height of the sub-image, and the origin is at the center of the sub-image.

15. A method for detecting an object in an image having a gray-level distribution, comprising the steps of:

determining a sub-image by detecting a pair of dark areas in the image;

selecting a subset of pixels in the image based on the location of the sub-image;

for pixels of the subset, deriving a first variable from the gray-level distribution of the image;

for the subset of pixels, deriving a second variable from a preset reference distribution, the reference distribution being characteristic of the object;

evaluating the correspondence between the first variable and the second variable over the subset of pixels; and determining whether the image contains the object based on the result of said evaluation step.

16. A computer-readable storage medium with program code stored therein for detecting an object in an image with a gray-level distribution, said program code comprising:

codes for determining a sub-image by detecting a pair of dark areas in the image;

codes for selecting an area on the basis of the location of the sub-image:

codes for deriving, for a subset of pixels in the selected area, a first variable from the gray-level distribution of the image, codes for deriving, for the subset of pixels, a second variable from a preset reference distribution, the reference distribution being characteristic of the object;

codes for evaluating the correspondence between the first variable and the second variable over the subset of pixels; and codes for determining whether the image contains the object based on the result of execution of said codes for evaluating.

17. An apparatus for detecting an object in an image having a gray-level distribution, comprising:

a sub-image determination unit adapted to determine a sub-image by detecting a pair of dark areas in the image;

a sub-image processor adapted to select a subset of pixels on the basis of the location of the sub-image;

a first calculation unit, adapted to derive a first variable from the gray-level distribution for the subset of pixels;

a second calculation unit, adapted to derive a second variable from a preset reference distribution for the subset of pixels, the reference distribution being characteristic of the object;

a correspondence evaluation processor, adapted to evaluate the correspondence between the first variable and the second variable over the subset of pixels; and a determination unit, adapted to make a determination as to whether the image contains the object based on the evaluation result produced by said correspondence evaluation unit.

* * * * *

UNITED STATES PATENT AND TRADEMARK OFFICE
CERTIFICATE OF CORRECTION

PATENT NO. : 7,103,218 B2  Page 1 of 5
APPLICATION NO. : 11/235132
DATED : September 5, 2006
INVENTOR(S) : Xinwu Chen et al.

It is certified that error appears in the above-identified patent and that said Letters Patent is hereby corrected as shown below:

TITLE PAGE, ITEM (30) Foreign Application Priority Data

"Sep. 15, 2000 (CN) .....00 1 27067" should read

--Sep. 15, 2000 (CN) .....00 1 27067.2--.

TITLE PAGE, ITEM (56) References Cited

Page 2, Other Publications, After "Wahl, F.M.,"

"Bildsignalverarabeitung" should read --Bildsignalverar beitung--; and

"translationas" should read --translation as--.

In the Drawings:

Fig. 15A, "Is" (all occurrences) should read --Is this--.

Fig. 16A, "Is" (all occurrences) should read --Is this--.

Fig. 17A, "Is" (all occurrences) should read --Is this--.

Col. 1, line 58, "contains" should read --contain--.

Col. 2, line 36, "image," should read --image;--.

line 41, "pixels;" should read --pixels; and--.

line 55, "pixels;" should read --pixels; and--.

Col. 3, line 18, "have" should read --to have--.

line 23, "determine" should read --determines--.

line 45, "surround" should read --surrounding--.

Col. 4, line 5, "step.'" should read --step.--.

line 50, "a'" (second occurrence) should read --an--.

line 65, "invention," should read --invention; and--.

UNITED STATES PATENT AND TRADEMARK OFFICE
CERTIFICATE OF CORRECTION

| | |
|---|---|
| PATENT NO. | : 7,103,218 B2 |
| APPLICATION NO. | : 11/235132 |
| DATED | : September 5, 2006 |
| INVENTOR(S) | : Xinwu Chen et al. |

It is certified that error appears in the above-identified patent and that said Letters Patent is hereby corrected as shown below:

Col. 5, line 3, "each" should be deleted.

line 67, "to," should read --to--.

Col. 6, line 4, "ran" should read --run--.

line 9, "comprises" should read --comprise--.

line 63, "a" should read --a--.

Col. 7, line 30, "reads" should read --reading--.

line 40, "sub-images)" should read --sub-images--.

line 59, "intervals II-1," should read --intervals I1-1,--.

line 62, close right margin.

line 63, close left margin.

Col. 9, line 3, "levelis" should read --level is--.

line 54, "instep" should read --in step--.

Col. 10, line 44, "last," should read --last--.

line 46, "set" should read --sets--.

Col. 11, line 62, "EyeBGary1" should read --EyeBGray1--.

Col. 13, line 23, "tray" should read --gray--.

line 35, "the" should read --their--.

line 36, "of them" should be deleted.

UNITED STATES PATENT AND TRADEMARK OFFICE
CERTIFICATE OF CORRECTION

PATENT NO.      : 7,103,218 B2
APPLICATION NO. : 11/235132
DATED           : September 5, 2006
INVENTOR(S)     : Xinwu Chen et al.

It is certified that error appears in the above-identified patent and that said Letters Patent is hereby corrected as shown below:

Col. 15, line 11, "G=0.12219xL$^2$-0.0009063x2" should read

--G=0.12219 x L-0.0009063 x L$^2$--.

line 14, "ranged" should read --ranging--.

line 15, "and is also ranged" should read --also ranging--.

line 22, "valves" should read --values--.

line 44, "mi" should read --in--.

line 46, "has" should read --have--.

line 58, "method," should read --methods--.

Col. 16, line 10, "show" should read --shown--.

Col. 17, line 4,  "Rectangle" should read --rectangle--.

line 8,  "coordinate" should read --coordinates--.

line 10, "is" should read --are--.

line 11, "coordinate" should read --coordinates--.

line 13, "is" should read --are--.

line 25, "within" should read --is within--.

line 40, "pixel.  Where, k is an integer ranged" should read --pixel, where k is an integer ranging--.

Col. 18, line 15, "W1=(|Dx1| + |DY1|/255" should read --W1=(|DX1| + |DY1|)/255--.

line 67, "(-2(x-x$_c$)/α$^2$" should read --(-2(x-x$_c$)/a$^2$--.

UNITED STATES PATENT AND TRADEMARK OFFICE
CERTIFICATE OF CORRECTION

PATENT NO. : 7,103,218 B2
APPLICATION NO. : 11/235132
DATED : September 5, 2006
INVENTOR(S) : Xinwu Chen et al.

It is certified that error appears in the above-identified patent and that said Letters Patent is hereby corrected as shown below:

Col. 19, line 1, "z/∂y)" should read --∂z/∂y)--.

line 2, "z/∂d)" should read --∂z/∂y)--.

line 6, "ration" should read --ratio--.

line 19, "$\nabla z \cdot \nabla g / (|\nabla g| \cdot \nabla z|)$" should read --$\nabla z \cdot \nabla g / (|\nabla g| \cdot |\nabla z|)$--.

line 21, "$(\nabla z \cdot \nabla g|) / (|\nabla g| \cdot |\nabla z|)$" should read --$(|\nabla z \cdot \nabla g|) / (|\nabla g| \cdot |\nabla z|)$--.

Col. 20, line 14, "is ranged" should read --ranges--.

line 42, "direction" should read --directions--.

line 63, "Referred" should read --Referring--.

Col. 21, line 24, "determined" should read --determined;--.

line 50, "detect" should read --detects--.

Col. 22, line 5, "embodiment. Which" should read --embodiment, which--.

line 11, "is ranged" should read --ranges--.

line 28, "is" should read --be--.

line 42, "present" should read --of the present--.

line 47, "like);" should read --like),--.

Col. 23, line 31, "method," should read --methods,--.

Col. 24, line 2, "image," should read --image;--.

UNITED STATES PATENT AND TRADEMARK OFFICE
CERTIFICATE OF CORRECTION

PATENT NO.       : 7,103,218 B2
APPLICATION NO.  : 11/235132
DATED            : September 5, 2006
INVENTOR(S)      : Xinwu Chen et al.

It is certified that error appears in the above-identified patent and that said Letters Patent is hereby corrected as shown below:

Col. 26, line 10, "image," should read --image;--.

line 35, "a" should read --¶ a--.

line 37, close right margin

Signed and Sealed this

Fifteenth Day of April, 2008

JON W. DUDAS
*Director of the United States Patent and Trademark Office*